United States Patent
Shimizu et al.

(10) Patent No.: US 10,516,596 B2
(45) Date of Patent: Dec. 24, 2019

(54) INFORMATION PROCESSING APPARATUS, METHOD AND NON-TRANSITORY COMPUTER-READABLE STORAGE MEDIUM

(71) Applicant: FUJITSU LIMITED, Kawasaki-shi, Kanagawa (JP)

(72) Inventors: Toshihiro Shimizu, Kawasaki (JP); Kohta Nakashima, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/038,496

(22) Filed: Jul. 18, 2018

(65) Prior Publication Data

US 2019/0044842 A1    Feb. 7, 2019

(30) Foreign Application Priority Data

Aug. 1, 2017 (JP) .................. 2017-149488

(51) Int. Cl.
*H04L 12/751* (2013.01)
*H04L 29/08* (2006.01)
(Continued)

(52) U.S. Cl.
CPC ............ *H04L 45/02* (2013.01); *G06F 9/4881* (2013.01); *G06F 9/5011* (2013.01)

(58) Field of Classification Search
CPC ....... H04L 45/02; G06F 9/5011; G06F 9/4881
See application file for complete search history.

(56) References Cited

U.S. PATENT DOCUMENTS

2005/0237930 A1* 10/2005 Patt-Shamir .......... G06F 9/4881
370/229
2012/0106556 A1    5/2012 Naruse
(Continued)

FOREIGN PATENT DOCUMENTS

JP    2012-098881    5/2012
WO    2011/059090    5/2011

OTHER PUBLICATIONS

M. Valerio et al., "Recursively Scalable Fat-Trees as Interconnection Networks", IEEE 13th Annual International Phoenix Conference on Computers and Communications, pp. 40-46, 1994 (7 pages).

*Primary Examiner* — Kiet Tang
(74) *Attorney, Agent, or Firm* — Fujitsu Patent Center

(57) ABSTRACT

A system includes spine switches, leaf switches, information processing apparatuses, and a processor configured to allocate a first leaf switch group to a first job, the first leaf switch group corresponding to a first column in a lattice part including points other than points at infinity of a finite projective plane corresponding to a Latin square fat-tree, and allocate a second leaf switch group to a second job, the second leaf switch group corresponding a second column, and transmit first schedule information on first communication related to the first job to a first information processing apparatus coupled to the first leaf switch group, and transmit second schedule information on second communication related to the second job to a second information processing apparatus coupled to the second leaf switch group, wherein the first and second communication are collective communication in which each of the information processing apparatuses communicates with others.

20 Claims, 43 Drawing Sheets

(51) Int. Cl.
*G06F 9/48* (2006.01)
*G06F 9/50* (2006.01)

(56) References Cited

U.S. PATENT DOCUMENTS

2012/0233621 A1 9/2012 Doi et al.
2016/0352824 A1* 12/2016 Miwa .................. H04L 67/1044

* cited by examiner

FIG. 9

| COLUMN | 1 | 2 | 3 |
|---|---|---|---|
| ALLOCATION | FALSE | FALSE | FALSE |

FIG. 12

| COLUMN | 1 | 2 | 3 |
|---|---|---|---|
| ALLOCATION | TRUE | TRUE | FALSE |

FIG. 18
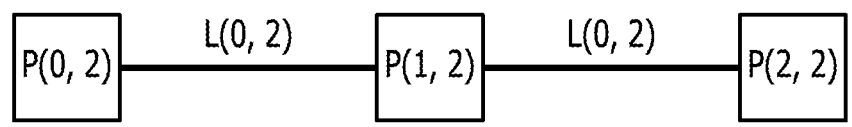
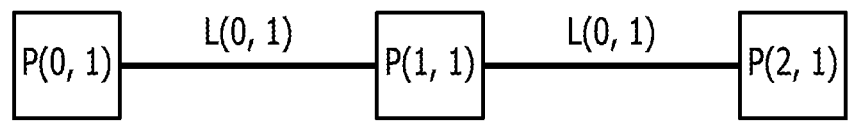
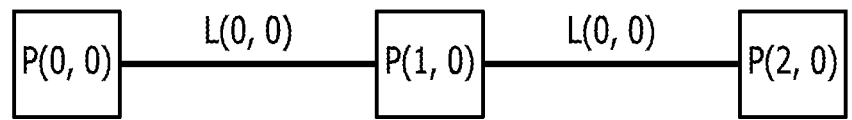

FIG. 22

| PHASE GROUP | TRANSMISSION SOURCE |
|---|---|
| | 0 |
| 0 | ∞ |
| 1 | ∞ |

FIG. 23

| PHASE GROUP | TRANSMISSION SOURCE |
| --- | --- |
|  | 0 |
| 0 | ∞ |
| 1 | ∞ |
| 2 | 0 |
| 3 | 1 |
| 4 | 2 |
| 5 | * |

FIG. 24

| PHASE GROUP | TRANSMISSION SOURCE | |
|---|---|---|
| | 0 | 0 |
| 0 | ∞ | 2 |
| 1 | ∞ | * |
| 2 | 0 | ∞ |
| 3 | 1 | ∞ |
| 4 | 2 | 0 |
| 5 | * | 1 |

FIG. 27

| PHASE GROUP | PHASE NUMBER | PHASE SERIAL NUMBER | TRANSMISSION SOURCE | | | | | | | | | | | |
|---|---|---|---|---|---|---|---|---|---|---|---|---|---|---|
| | | | 0 | 1 | 2 | 3 | 4 | 5 | 6 | 7 | 8 | 9 | 10 | 11 |
| 0 | 0 | 0 | 4 | 11 | 6 | 9 | 8 | 3 | 10 | 1 | 0 | 7 | 2 | 5 |
| | 1 | 1 | 5 | 10 | 7 | 8 | 9 | 2 | 11 | 0 | 1 | 6 | 3 | 4 |
| 1 | 0 | 0 | 8 | 1 | 10 | 3 | 0 | 5 | 2 | 7 | 4 | 9 | 6 | 11 |
| | 1 | 1 | 9 | 0 | 11 | 2 | 1 | 4 | 3 | 6 | 5 | 8 | 7 | 10 |
| 2 | 0 | 0 | 2 | 5 | 0 | 7 | 6 | 9 | 4 | 11 | 10 | 1 | 8 | 3 |
| | 1 | 1 | 3 | 4 | 1 | 6 | 7 | 8 | 5 | 10 | 11 | 0 | 9 | 2 |
| 3 | 0 | 0 | 6 | 9 | 4 | 11 | 10 | 1 | 8 | 3 | 2 | 5 | 0 | 7 |
| | 1 | 1 | 7 | 8 | 5 | 10 | 11 | 0 | 9 | 2 | 3 | 4 | 1 | 6 |
| 4 | 0 | 0 | 10 | 3 | 8 | 1 | 2 | 7 | 0 | 5 | 6 | 11 | 4 | 9 |
| | 1 | 1 | 11 | 2 | 9 | 0 | 3 | 6 | 1 | 4 | 7 | 10 | 5 | 8 |
| 5 | 0 | 0 | 0 | 7 | 2 | 5 | 4 | 11 | 6 | 9 | 8 | 3 | 10 | 1 |
| | 1 | 1 | 1 | 6 | 3 | 4 | 5 | 10 | 7 | 8 | 9 | 2 | 11 | 0 |

FIG. 31

| H | T |
|---|---|
| 1 | 5 |

FIG. 34

| H | T |
|---|---|
| 1 | 7 |

FIG. 36

| H | T |
|---|---|
| 5 | 3 |

FIG. 37

| H | T |
|---|---|
| 7 | 3 |

▨ : Leaf SWITCH

☐ : Spine SWITCH

◯ : SERVER

INFORMATION PROCESSING APPARATUS, METHOD AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-149488, filed on Aug. 1, 2017, the entire contents of which are incorporated herein by reference.

FIELD

The embodiments discussed herein are related to an information processing apparatus, a method and a non-transitory computer-readable storage medium.

BACKGROUND

When the efficiency of communication in a parallel computer is increased by optimization of a coupling topology (in other words, a network topology) of servers and switches in the parallel computer, the throughput of parallel distributed processing performed by the parallel computer may be enhanced. Also, if it is possible to couple a large number of servers with a small number of switches by optimization of the network topology in a parallel computer, the construction cost of the parallel computer may be reduced.

A document discloses a network topology called a Latin square fat-tree. The Latin square fat-tree has the characteristics that between any two different Leaf switches, there exists a path that goes through Spine switches. When a Latin square fat-tree is used, it is possible to couple many servers with less number of switches, compared with a typical two-stage fat-tree.

Meanwhile, all-to-all communication is collective communication in which each of servers performs communication with all other servers, and thus communication volume is large and route conflict is likely to occur as compared with other collective communications such as all-reduce communication. Here, the route conflict means that multiple packets are transmitted at the same time over a route in the same direction. In a system which adopts a Latin square fat-tree (hereinafter, referred to as a Latin square fat-tree system), multiple jobs are executed concurrently and all-to-all communication may be performed in each of the multiple jobs. In such a situation, no technique in related art suppresses an occurrence of path conflict. Related technique is disclosed in M. Valerio, L. E. Moser and P. M. Melliar-Smith, "Recursively Scalable Fat-Trees as Interconnection Networks", IEEE 13th Annual International Phoenix Conference on Computers and Communications, 1994.

SUMMARY

According to an aspect of the invention, an information processing system includes a plurality of spine switches, a plurality of leaf switches coupled to the plurality of spine switches in a Latin square fat-tree topology, a plurality of information processing apparatuses coupled to the plurality of leaf switches, and a processor configured to control communication between the plurality of information processing apparatuses, wherein the processor is configured to allocate a first leaf switch group of the plurality of leaf switches to a first job, the first leaf switch group corresponding to a first column of a plurality of columns in a lattice part including points other than points at infinity of a finite projective plane corresponding to the Latin square fat-tree, and allocate a second leaf switch group of the plurality of leaf switches to a second job, the second leaf switch group corresponding to a second column different from the first column of the plurality of columns, and transmit first schedule information on first communication related to the first job to a first information processing apparatus included in the plurality of information processing apparatuses coupled to the first leaf switch group, and transmit second schedule information on second communication related to the second job to a second information processing apparatus included in the plurality of information processing apparatuses coupled to the second leaf switch group, wherein the first communication and the second communication are collective communication in which each of the plurality of information processing apparatuses communicates with other information processing apparatuses.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a table illustrating example allocation management data stored in a management data storage unit in the first embodiment;

FIG. 12 is a table illustrating example allocation management data stored in a management data storage unit in the first embodiment;

FIG. 18 is a diagram illustrating a correspondence relationship between slope and Spine switch;

FIG. 22 is a table for explaining a method of generating a communication table;

FIG. 23 is a table for explaining a method of generating a communication table;

FIG. 24 is a table for explaining a method of generating a communication table;

FIG. 27 is a table illustrating an example communication table;

FIG. 31 is a table illustrating example allocation management data stored in a management data storage unit in the second embodiment;

FIG. 34 is a table illustrating example allocation management data stored in a management data storage unit in the second embodiment;

FIG. 36 is a table illustrating example allocation management data stored in a management data storage unit in the second embodiment;

FIG. 37 is a table illustrating example allocation management data stored in a management data storage unit in the second embodiment;

DESCRIPTION OF EMBODIMENTS

First Embodiment

As described above, path conflict means that multiple packets are transmitted at the same time over a path in the same direction, and communication time increases due to an occurrence of path conflict.

Figure 1:
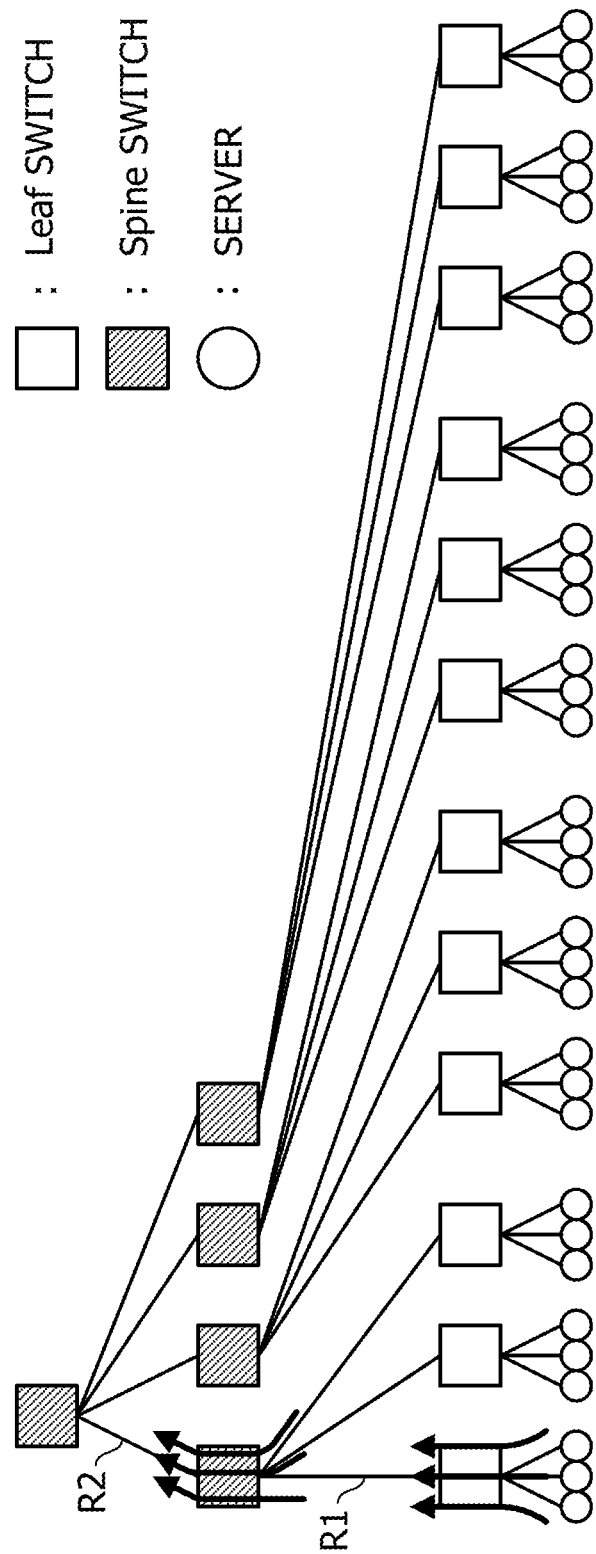
FIG. 1 is a diagram illustrating path conflict when all-to-all communication is performed in a tree structure topology.
Figure 2:
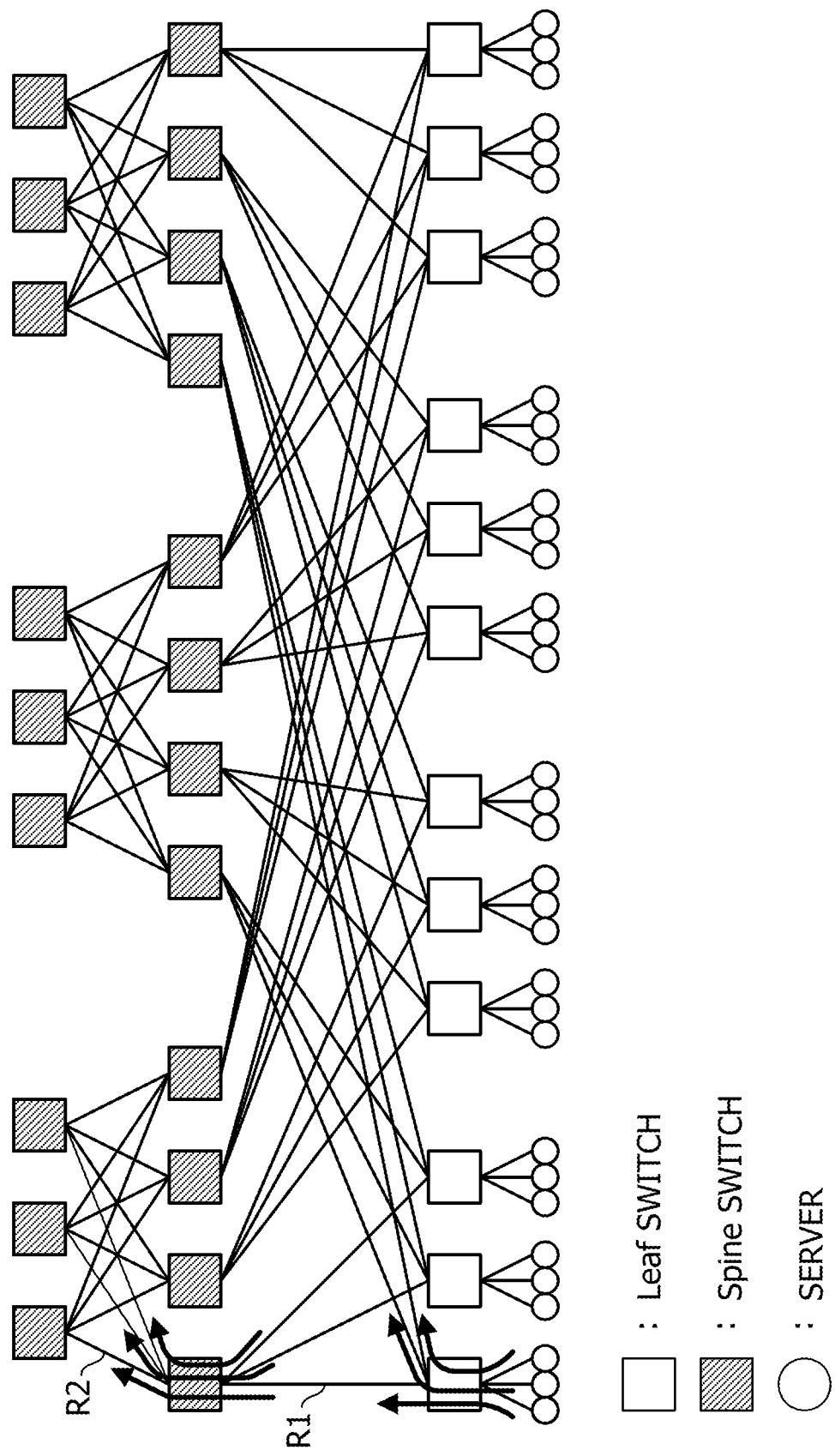
FIG. 2 is a diagram illustrating path conflict when all-to-all communication is performed in a fat-tree structure topology.

As an example, FIG. 1 illustrates path conflict when all-to-all communication is performed in a typical tree structure topology. In FIG. 1, each circular figure represents a server, each unhatched square figure represents a Leaf switch, and each hatched square figure represents a Spine switch. In FIG. 1, route conflict occurs in a route R1, and route conflict also occurs in a route R2. In this case, for instance, as illustrated in FIG. 2, although it is possible to avoid the route conflict by changing the tree structure to a fat-tree structure, when a fat-tree structure is adopted, the total number of switches exceeds the number of switches in the example of FIG. 1.

In the embodiment described below, when multiple jobs in which all-to-all communication is performed are executed in a Latin square fat-tree system, it is aimed that an occurrence of route conflict is avoided.

Figure 3:
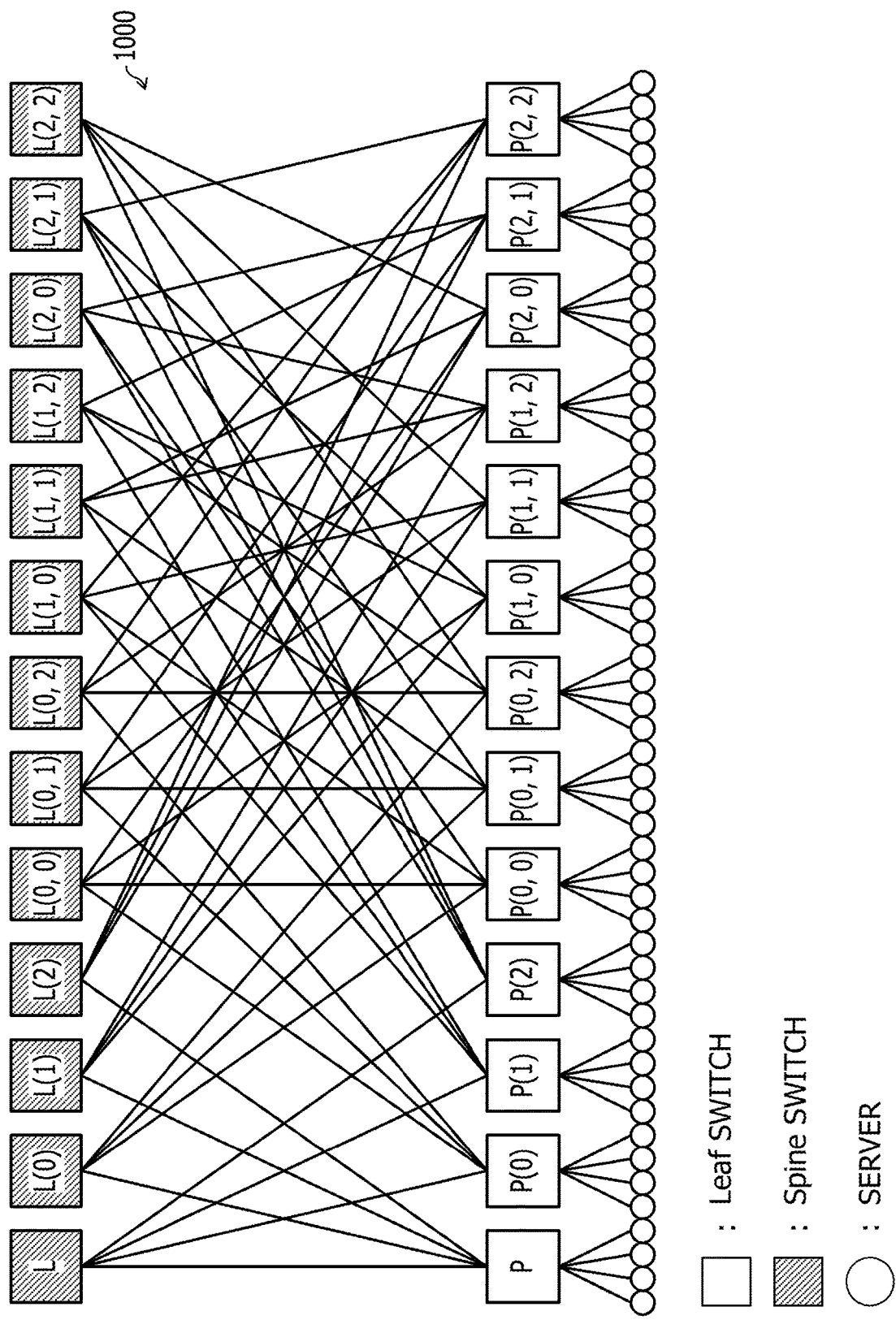
FIG. 3 is a diagram illustrating an overview of a Latin square fat-tree system in the embodiment.

FIG. 3 is a diagram illustrating a Latin square fat-tree system 1000 in the embodiment. In the embodiment, the coupling topology between 13 Spine switches and 13 Leaf switches provides a Latin square fat-tree. Since four servers are coupled to each of Leaf switches, the Latin square fat-tree system 1000 has 52 servers that execute parallel distributed processing. Each Spine switch and Leaf switch are InfiniBand switches, for instance. Each server is a physical server, for instance. Hereinafter, let d be the number of servers coupled to each Leaf switch. In the embodiment, d=4.

Although the number of Spine switches and the number of Leaf switches are 13 in the example of FIG. 3, the number may be other than 13. See appendix for other examples.

Figure 4:
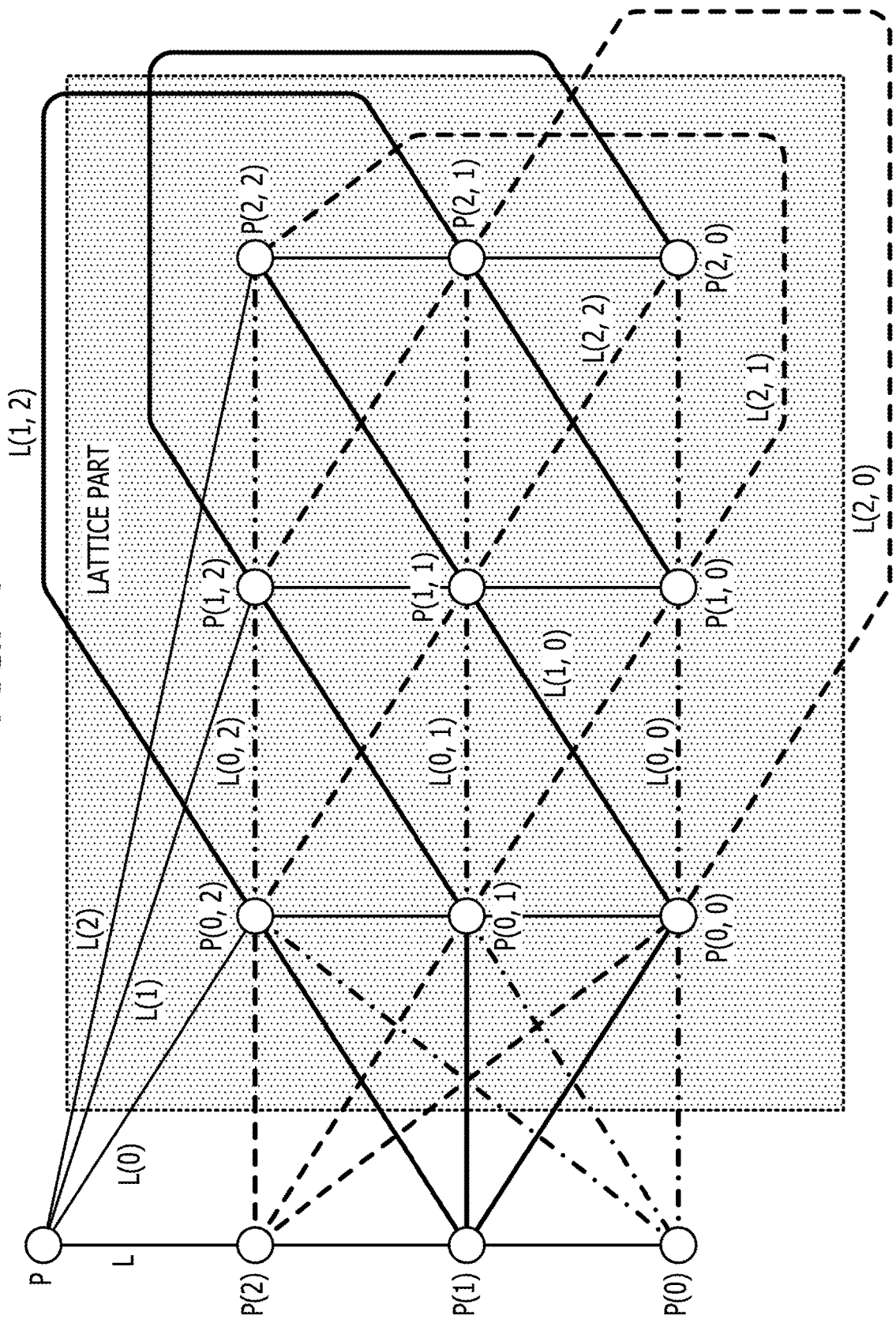
FIG. 4 is a diagram illustrating a finite projective plane.

In FIG. 3, each Spine switch and each Leaf switch are labeled with a character string indicating a point on a finite projective plane which corresponds to the Latin square fat-tree illustrated in FIG. 3. FIG. 4 is a diagram illustrating a finite projective plane corresponding to the Latin square fat-tree illustrated in FIG. 3. The order n of the finite projective plane illustrated in FIG. 4 is three, and the port number of each Spine switch and Leaf switch is eight. Each point represents a Leaf switch, and each line segment represents a Spine switch. When a lattice part is defined as illustrated in FIG. 4, Leaf switch P, Leaf switch P(0), Leaf switch P(1), and Leaf switch P(2) correspond to points at infinity. See appendix for finite projective plane.

Figure 5:
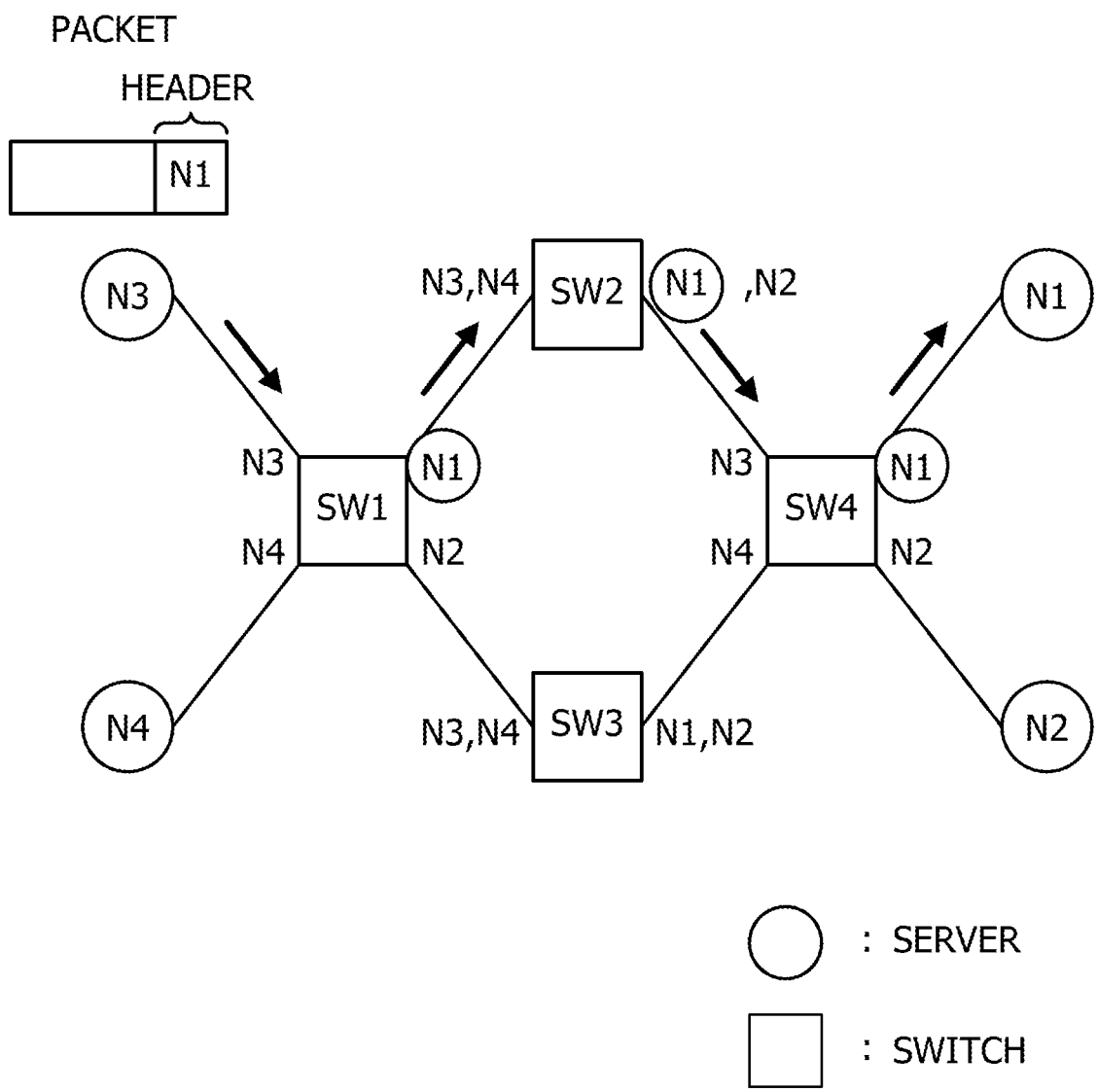
FIG. 5 is a diagram for explaining routing in an Infini-Band network.

In the Latin square fat-tree system 1000 in the embodiment, in order to avoid route conflict, an InfiniBand network in which regular and static routing is performed is utilized. The routing in an InfiniBand network will be described with reference to FIG. 5. In FIG. 5, each circular figure represents a server, and each square figure represents a switch. Each line segment represents an InfiniBand link, and each character string near the line segment represents identification information of a destination server. Each thick solid line arrow represents a communication route.

In the example of FIG. 5, a server N3 transmits a packet whose destination is a server N1. The header of a packet contains identification information (for instance, local identifier (LID)) of a destination. Each output port in each switch is associated with identification information of a destination server, and each switch outputs a packet to an output port corresponding to identification information of a destination contained in the packet. In the example of FIG. 5, a packet arrives at a server N1 through a switch SW1, a switch SW2, and a switch SW4.

Like this, the network in the embodiment is not like Ethernet (registered trademark) in which a route is automatically determined, but a network in which regular and static routing is performed.

Figure 6:
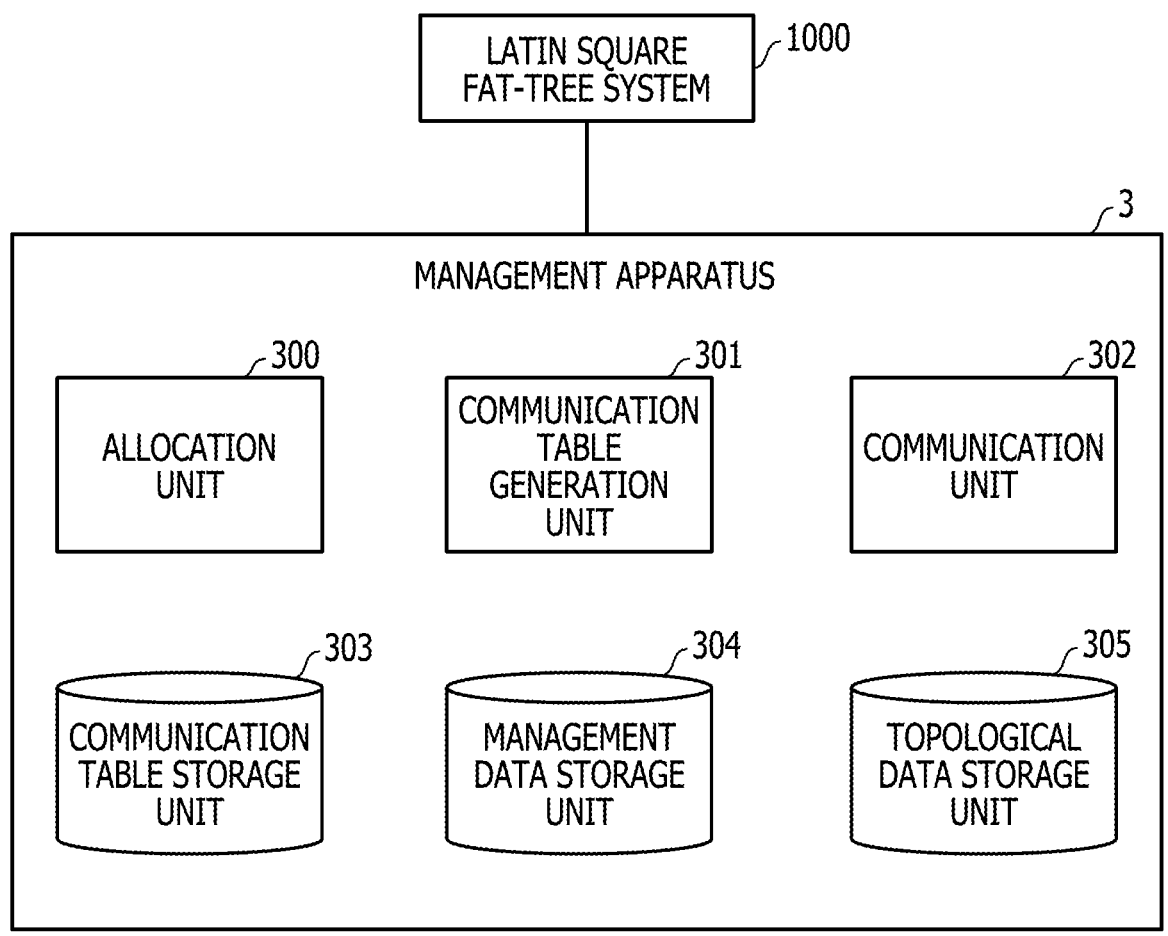
FIG. 6 is a functional block diagram of a management apparatus in a first embodiment.

As illustrated in FIG. 6, the Latin square fat-tree system 1000 is coupled to a management apparatus 3 via a management local area network (LAN), and communication in the Latin square fat-tree system 1000 is managed by the management apparatus 3. The management apparatus 3 has an allocation unit 300, communication table generation unit 301, a communication unit 302, a communication table storage unit 303, a management data storage unit 304, and a topological data storage unit 305. The allocation unit 300, the communication table generation unit 301, and the communication unit 302 are implemented, for instance, by a central processing unit (CPU) 2503 in FIG. 42 executing a program which is loaded into a memory 2501 in FIG. 42. The communication table storage unit 303, the management data storage unit 304, and the topological data storage unit 305 are provided in, for instance, a memory 2501 or a hard disk drive (HDD) 2505 in FIG. 42.

The allocation unit 300 performs processing to allocate resources (specifically, such as a server and a Leaf switch) to a job based on the data stored in the management data storage unit 304 and the data stored in the topological data storage unit 305. The communication table generation unit 301 generates a communication table based on a result of allocation by the allocation unit 300 and the data stored in the topological data storage unit 305, and stores the generated communication table in the communication table storage unit 303. The communication unit 302 transmits the communication table stored in the communication table storage unit 303 to a server (hereinafter referred to as an execution server) allocated to a job at a predetermined timing or in response to a request.

Figure 7:
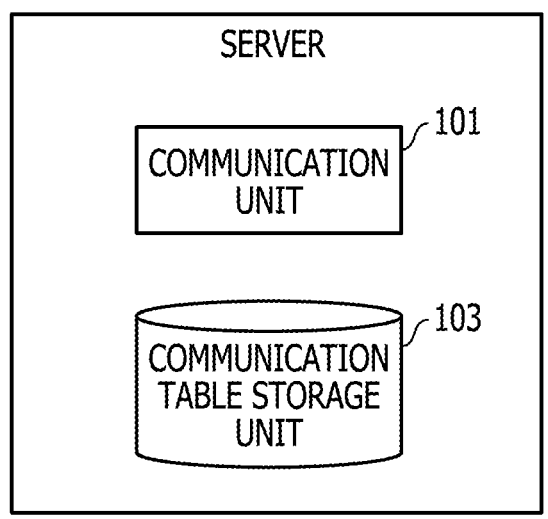
FIG. 7 is a functional block diagram of a server in the first embodiment.

FIG. 7 is a functional block diagram of a server. The server has a communication unit 101 and a communication table storage unit 103. The communication unit 101 is implemented, for instance, by the CPU 2503 in FIG. 42 executing a program which is loaded into the memory 2501 in FIG. 42. The communication table storage unit 103 is provided in the memory 2501 or the HDD 2505 in FIG. 42, for instance.

The communication table storage unit 103 stores a communication table received from the management apparatus 3. The communication unit 101 performs communication in accordance with the communication table stored in the communication table storage unit 103.

Figure 8:
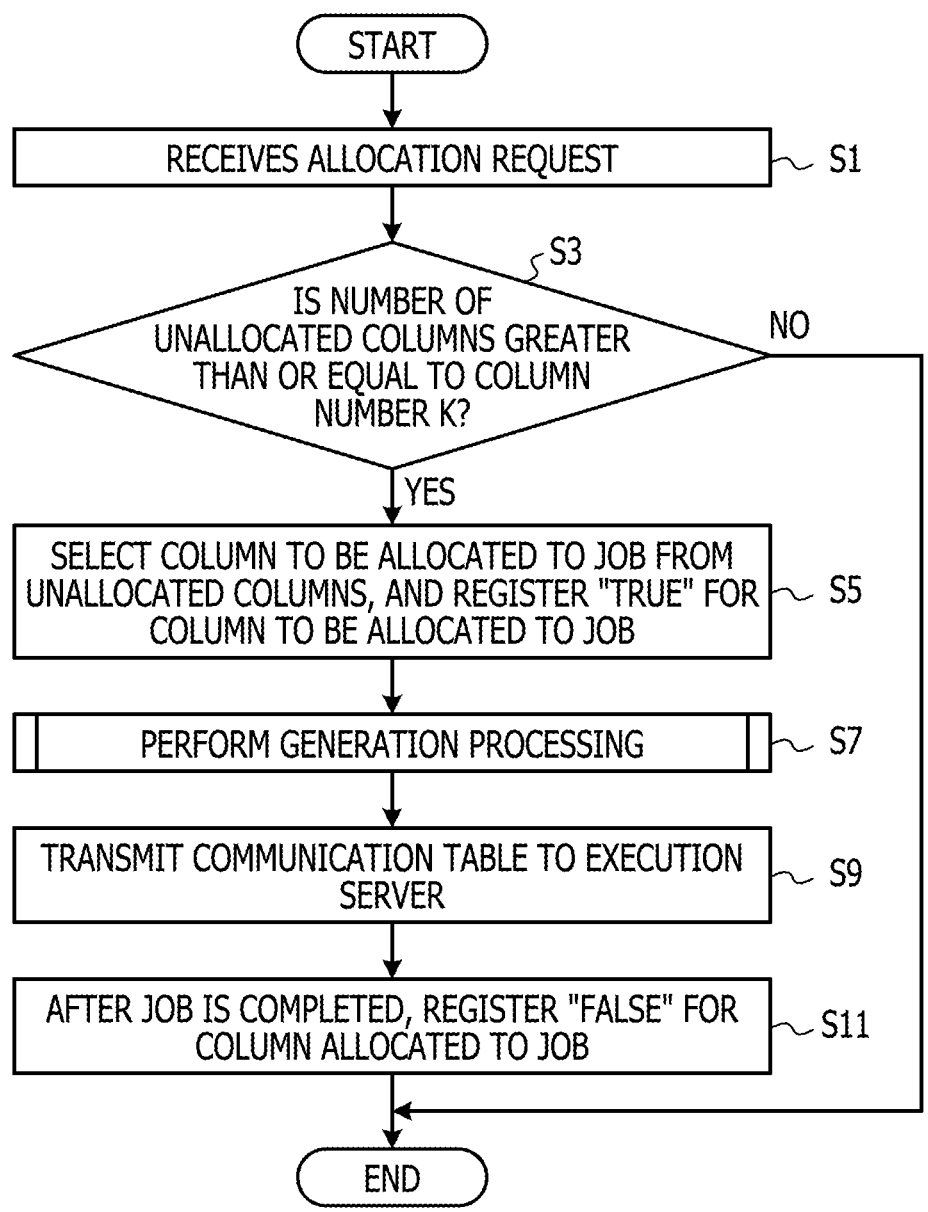
FIG. 8 is a flowchart illustrating the processing flow of processing executed by the management apparatus in the first embodiment.

Next, the processing executed by the management apparatus 3 in the first embodiment will be described. FIG. 8 is a flowchart illustrating the processing flow of processing executed by the management apparatus 3 in the first embodiment.

The allocation unit 300 in the management apparatus 3 receives an allocation request from a user (step S1 in FIG. 8). The allocation request is a request of allocation of resources to a job, and for instance, information s on the number of servers is included as a parameter. k*m is calculated by dividing s by the order n, and k and m are identified so that a condition (here, $1 \leq k \leq$, $1 \leq m \leq n$, and $k \geq m$) is satisfied. A parameter k expresses the number of columns allocated to a job among the columns in the lattice part, and a parameter m represents the number of servers involved in all-to-all communication among the servers coupled to the Leaf switches. It is to be noted that k and m may be contained in the allocation request as parameters.

The allocation unit 300 refers to the allocation management data stored in the management data storage unit 304, and determines whether the number of unallocated columns is greater than or equal to the column number k (step S3).

Figure 9:
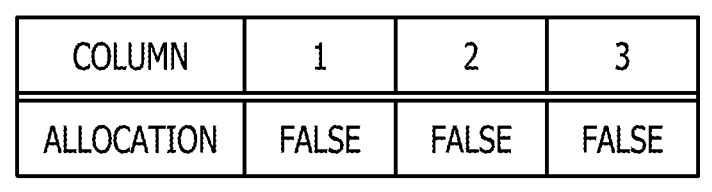

FIG. 9 is a table illustrating example allocation management data stored in the management data storage unit 304 in the first embodiment. In the example of FIG. 9, for each of the columns in the lattice part, information indicating whether or not the column is allocated to a job is stored. "FALSE" indicates that the column is not allocated to a job, and "TRUE" indicates that the column is allocated to a job. Like this, allocation management data in the first embodiment has an array format.

When the number of unallocated columns is less than the column number k (No Route in step S3), it is not possible to execute the job specified in the allocation request, thus the processing is terminated.

On the other hand, when the number of unallocated columns is greater than or equal to the column number k (Yes Route in step S3), the allocation unit 300 executes the following processing. Specifically, the allocation unit 300 selects one or more columns to be allocated to the job from the unallocated columns, and registers "TRUE" in the management data storage unit 304 in association with the one or more columns to be allocated to the job (step S5).

Figure 10:
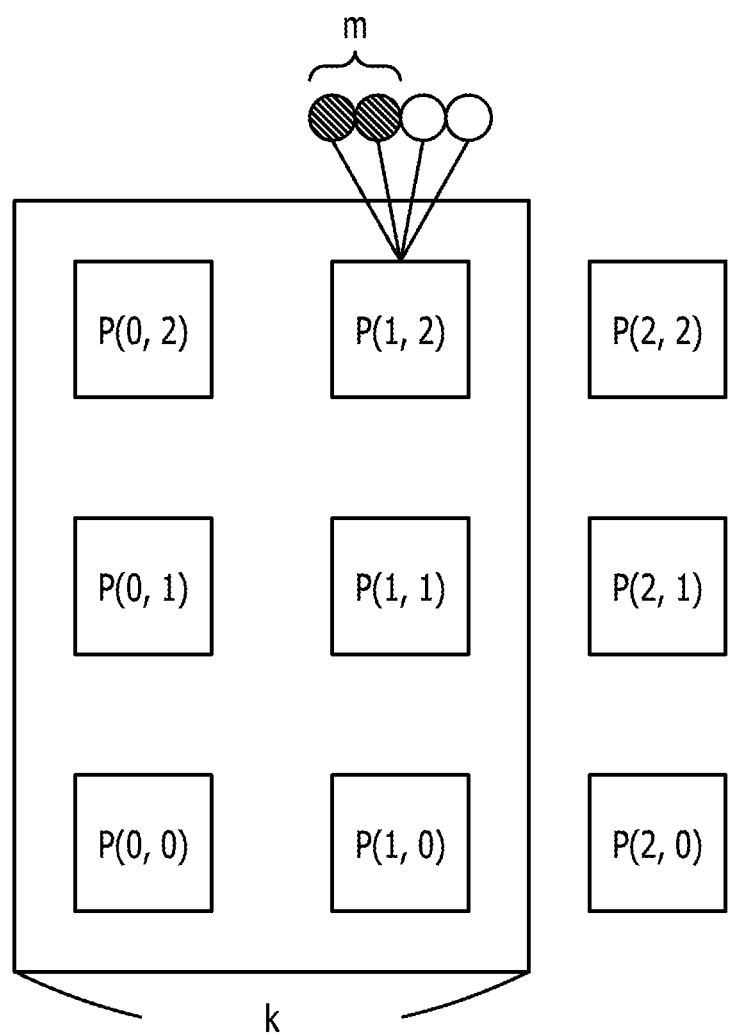
FIG. 10 is a diagram for explaining selection of one or more columns.
Figure 11:
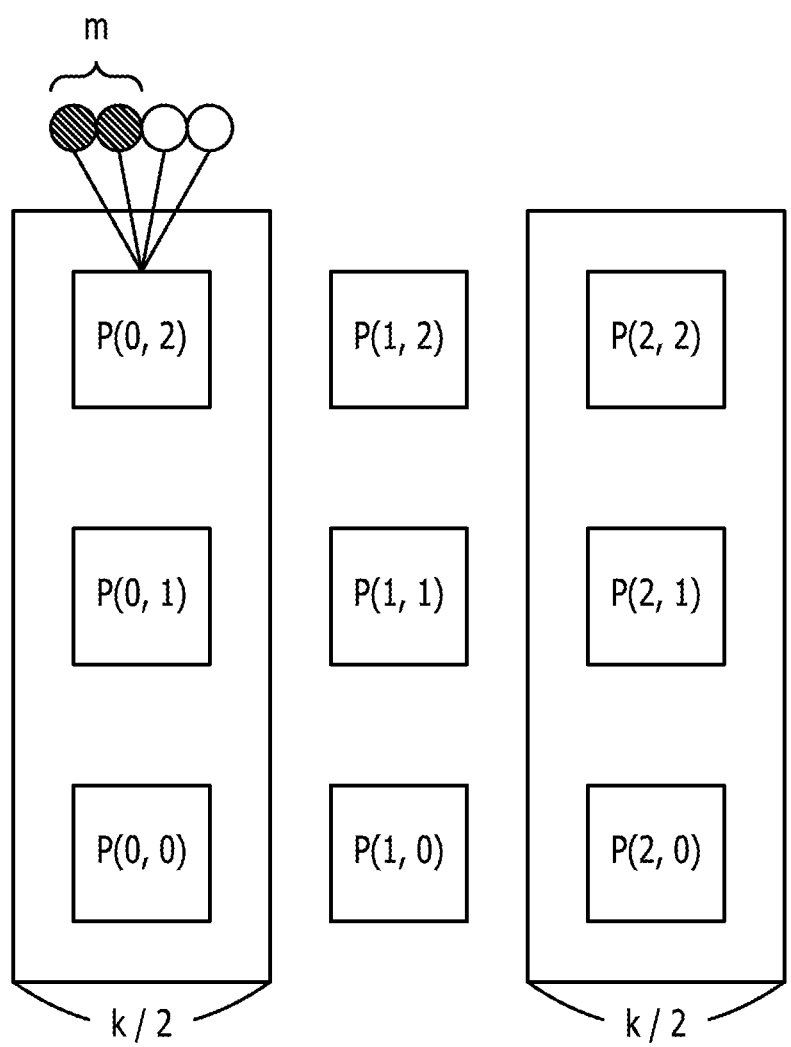
FIG. 11 is a diagram for explaining selection of one or more columns.

FIG. 10 is a diagram for explaining selection of one or more columns. In FIG. 10, nine Leaf switches in the lattice part are illustrated, and the first column and the second column surrounded by a frame out of three columns are selected. In the embodiment, the row number is n (that is, all rows are selected). In the example, k=2 and m=2, thus the number of execution servers is 12. It is to be noted that two columns selected when k=2 are not necessarily adjacent, and for instance, the first column and the third column may be selected as illustrated in FIG. 11.

Figure 12:
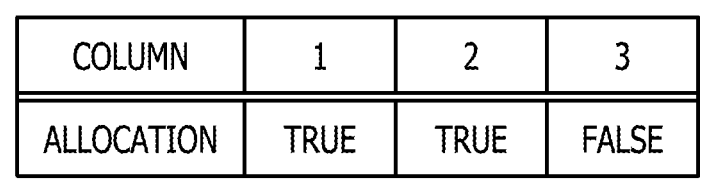

For instance, when columns are selected as illustrated in FIG. 10, the management data storage unit 304 is updated as illustrated in FIG. 12.

Figure 13:
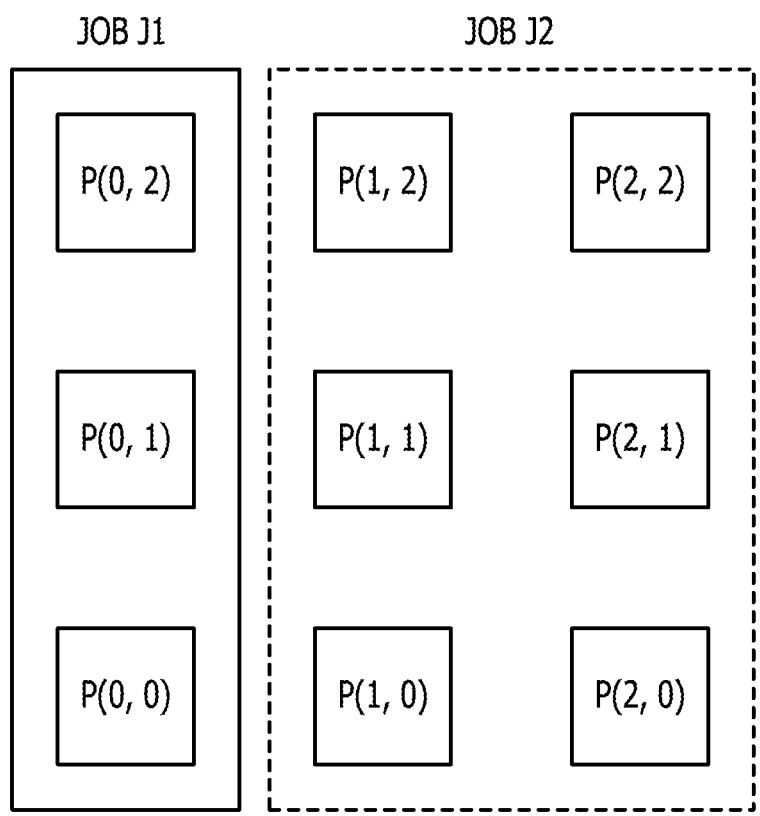
FIG. 13 is a diagram illustrating an example of allocation to multiple jobs.

Also, as illustrated in FIG. 13, the lattice part may be allocated to multiple jobs. In the example of FIG. 13, Leaf switch P(0, 0), Leaf switch P(0, 1), and Leaf switch P(0, 2) are allocated to job 31. Leaf switch P(1, 0), Leaf switch P(1, 1), Leaf switch P(1, 2), Leaf switch P(2, 0), Leaf switch P(2, 1), and Leaf switch P(2, 2) are allocated to job 32. Then all-to-all communication is performed in the job 31, and all-to-all communication is performed in the job 32.

As described above, when allocation is made to a job column by column, no route conflict occurs between jobs. The reason is that for communication from a Leaf switch to a Spine switch, a Leaf switch at a packet transmission source is distinct, thus a link is not shared. Also, for communication from a Spine switch to a Leaf switch, a Leaf switch at a destination is distinct, thus a link is not shared.

Returning to the description of FIG. 8, the communication table generation unit 301 performs generation processing to generate a communication table based on a result of allocation made by the allocation unit 300 and information on a network topology of the Latin square fat-tree system 1000 stored in the topological data storage unit 305 (step S7). The communication table includes information on a schedule of all-to-all communication performed by an execution server.

Figure 14:
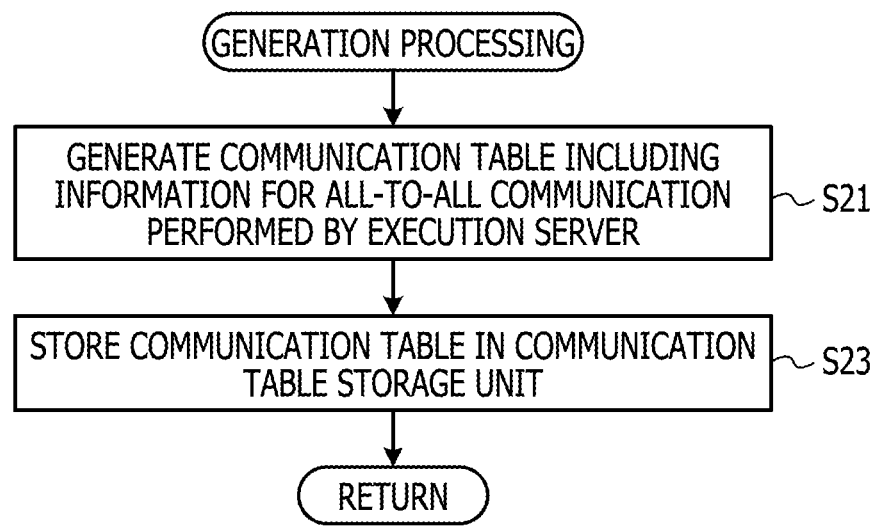
FIG. 14 is a flowchart illustrating the processing flow of generation processing.

FIG. 14 is a flowchart illustrating the processing flow of generation processing.

The communication table generation unit 301 generates a communication table including information on a schedule of all-to-all communication performed by an execution server (step S21 in FIG. 14).

Here, the scheduling of all-to-all communication performed by an execution server in the embodiment will be described. As an example, it is assumed that allocation of columns is made as illustrated in FIG. 10. Specifically, Leaf switches involved in all-to-all communication are Leaf switch P(0, 0), Leaf switch P(0, 1), Leaf switch P(0, 2), Leaf switch P(1, 0), Leaf switch P(1, 1), and Leaf switch P(1, 2). Also, of the servers coupled to each Leaf switch, two servers are involved in all-to-all communication.

Figure 15:
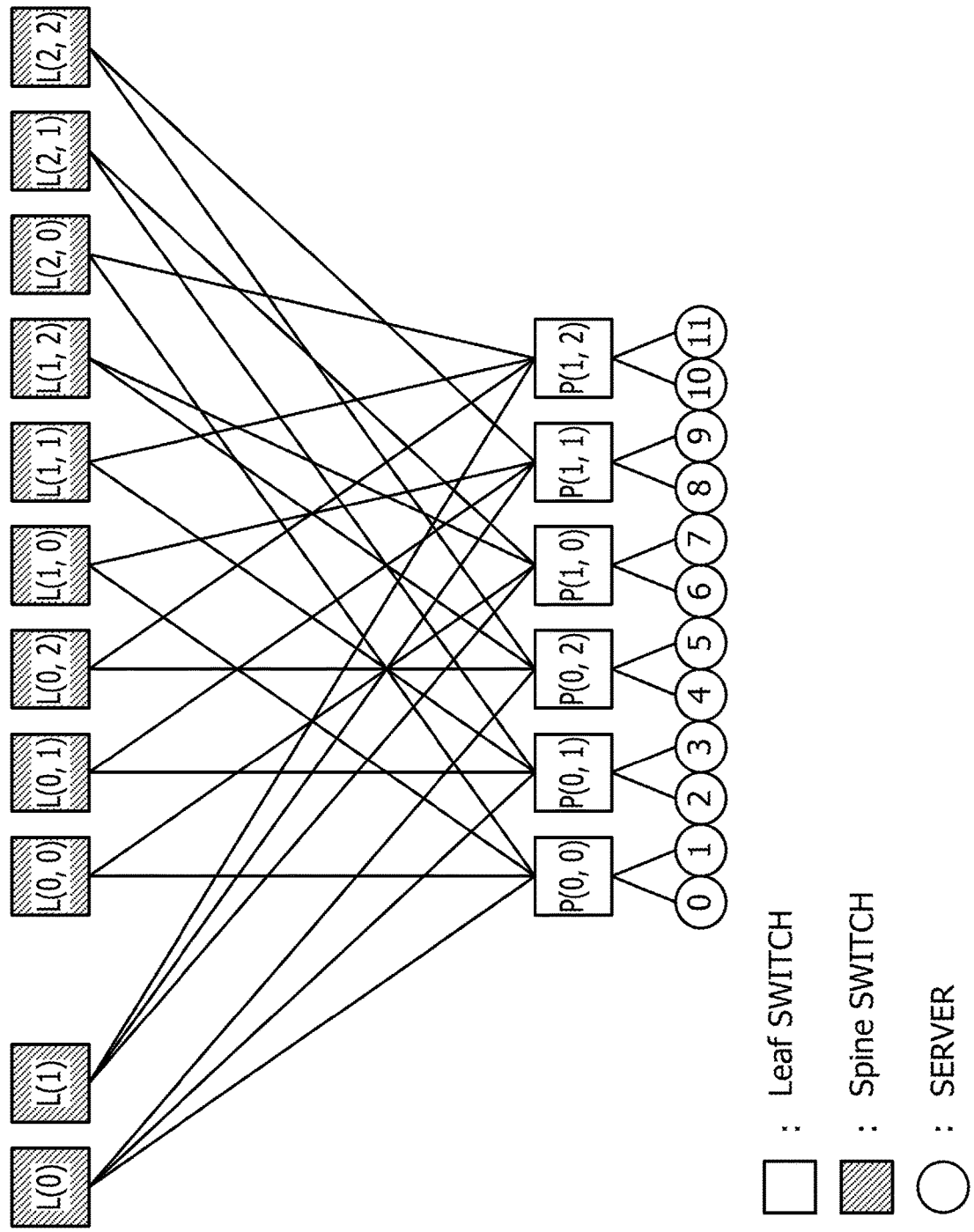
FIG. 15 is a diagram illustrating a network topology corresponding to columns allocated to a job.

FIG. 15 is a diagram illustrating a network topology corresponding to the columns allocated to a job. In FIG. 15, each Leaf switch is coupled to four Spine switches and two execution servers. For the convenience of description, each execution server is labeled with a number. Let the execution servers coupled to Leaf switch P(0, 0) be server "0" and server "1". Let the execution servers coupled to Leaf switch P(0, 1) be server "2" and server "3". Let the execution servers coupled to Leaf switch P(0, 2) be server "4" and server "5". Let the execution servers coupled to Leaf switch P(1, 0) be server "6" and server "7". Let the execution servers coupled to Leaf switch P(1, 1) be server "8" and server "9". Let the execution servers coupled to Leaf switch P(1, 2) be server "10" and server "11."

Figure 16:
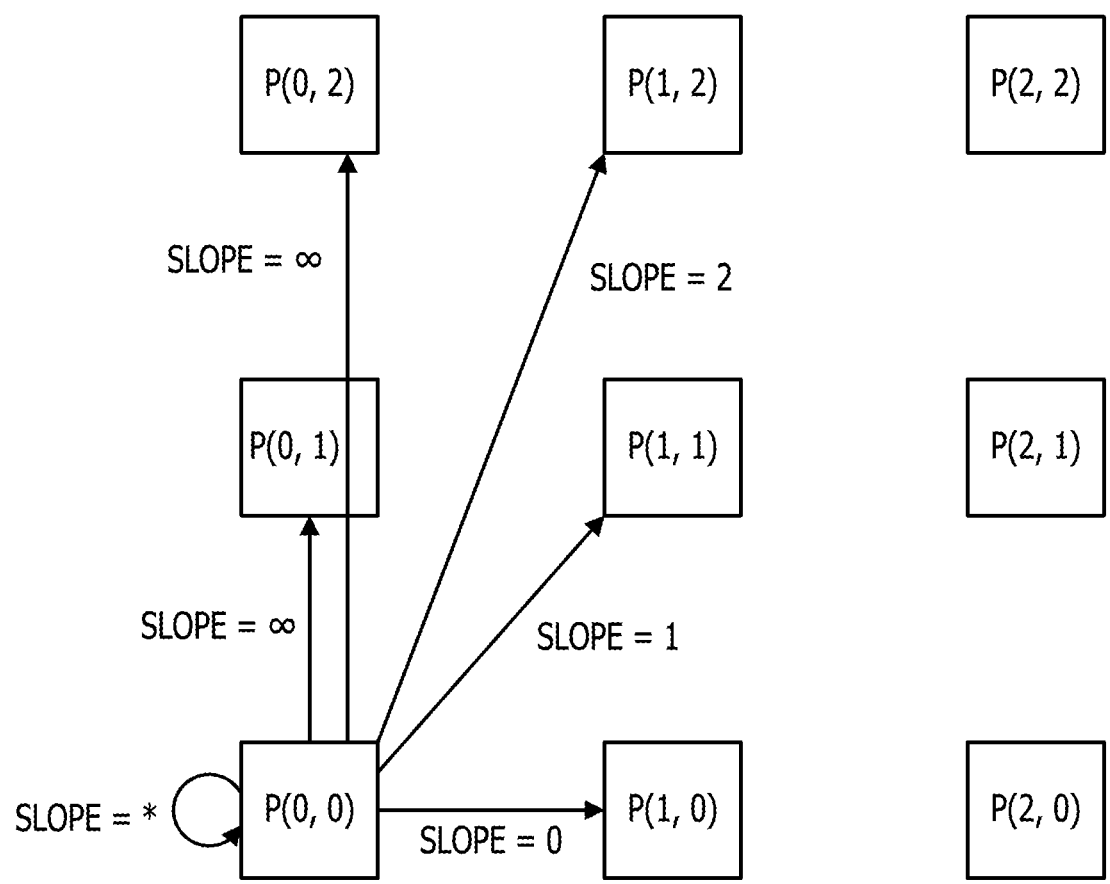
FIG. 16 is a diagram for explaining a slope.

Although each Leaf switch is coupled to four Spine switches, four Spine switches correspond to line segments having different slopes on a finite projective plane. Specifically, as illustrated in FIG. 16, one Leaf switch is associated with a line segment with the slope "00", a line segment with the slope "0", a line segment with the slope "1", and a line segment with the slope "2". Each of four Spine switches corresponds to one of the line segments. When a certain node transmits a packet to the node, the slope is denoted by "*". Line segments with the same slope do not intersect within the lattice part, but intersect at a point at infinity outside the lattice part.

Figure 17:
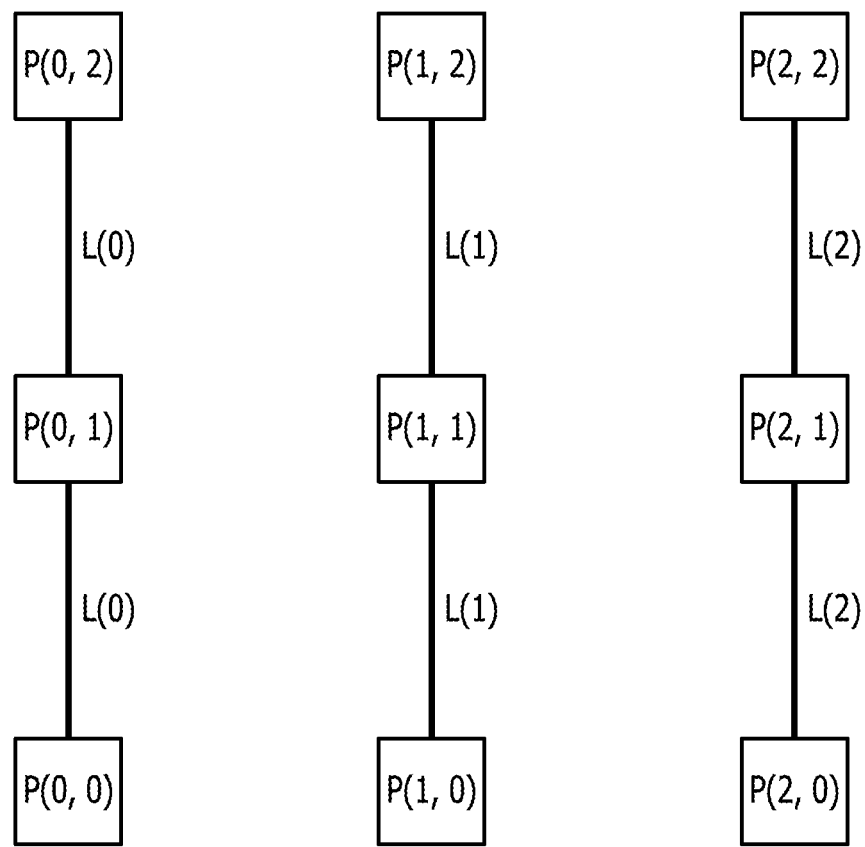
FIG. 17 is a diagram illustrating a correspondence relationship between slope and Spine switch.
Figure 19:
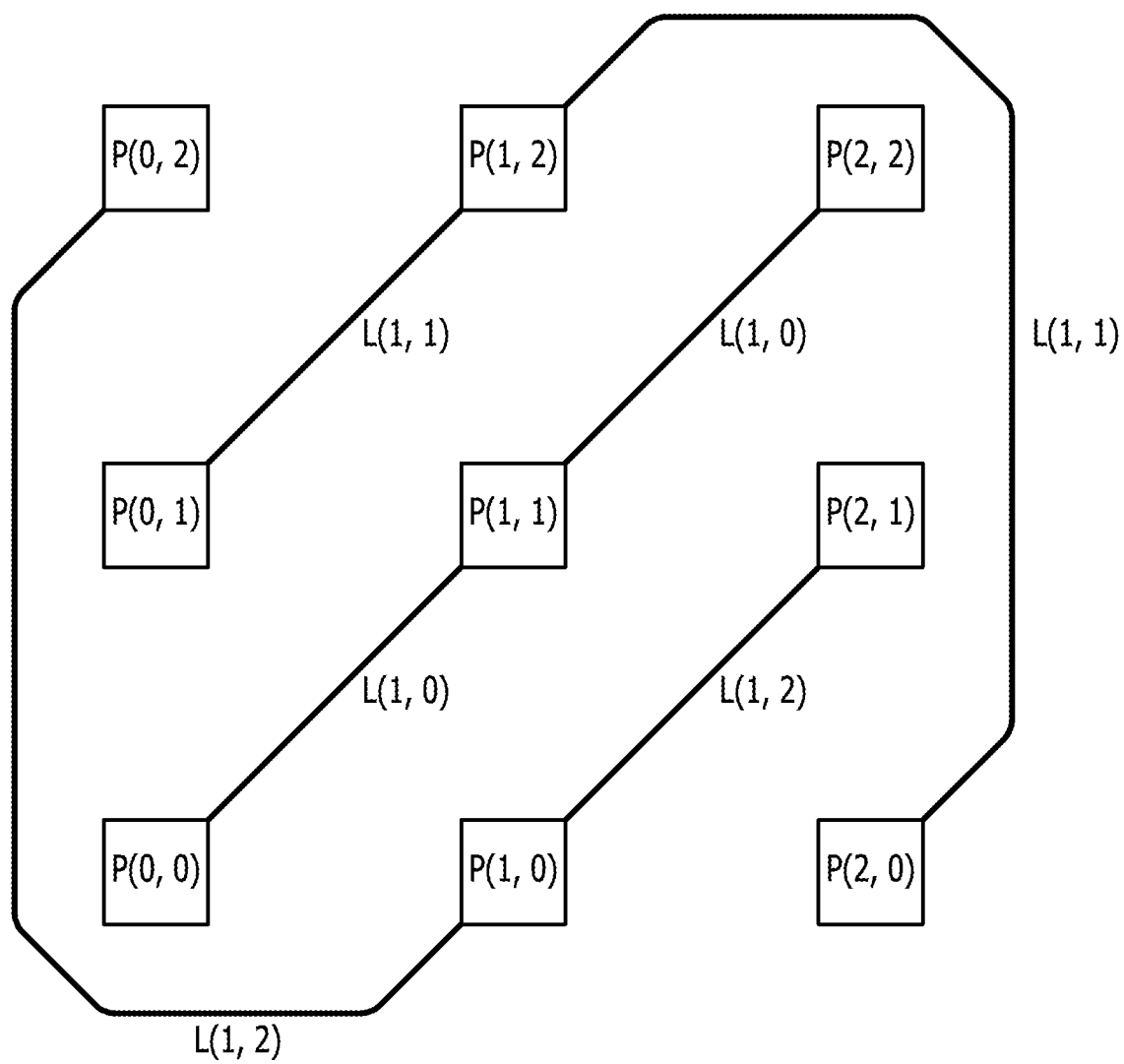
FIG. 19 is a diagram illustrating a correspondence relationship between slope and Spine switch.
Figure 20:
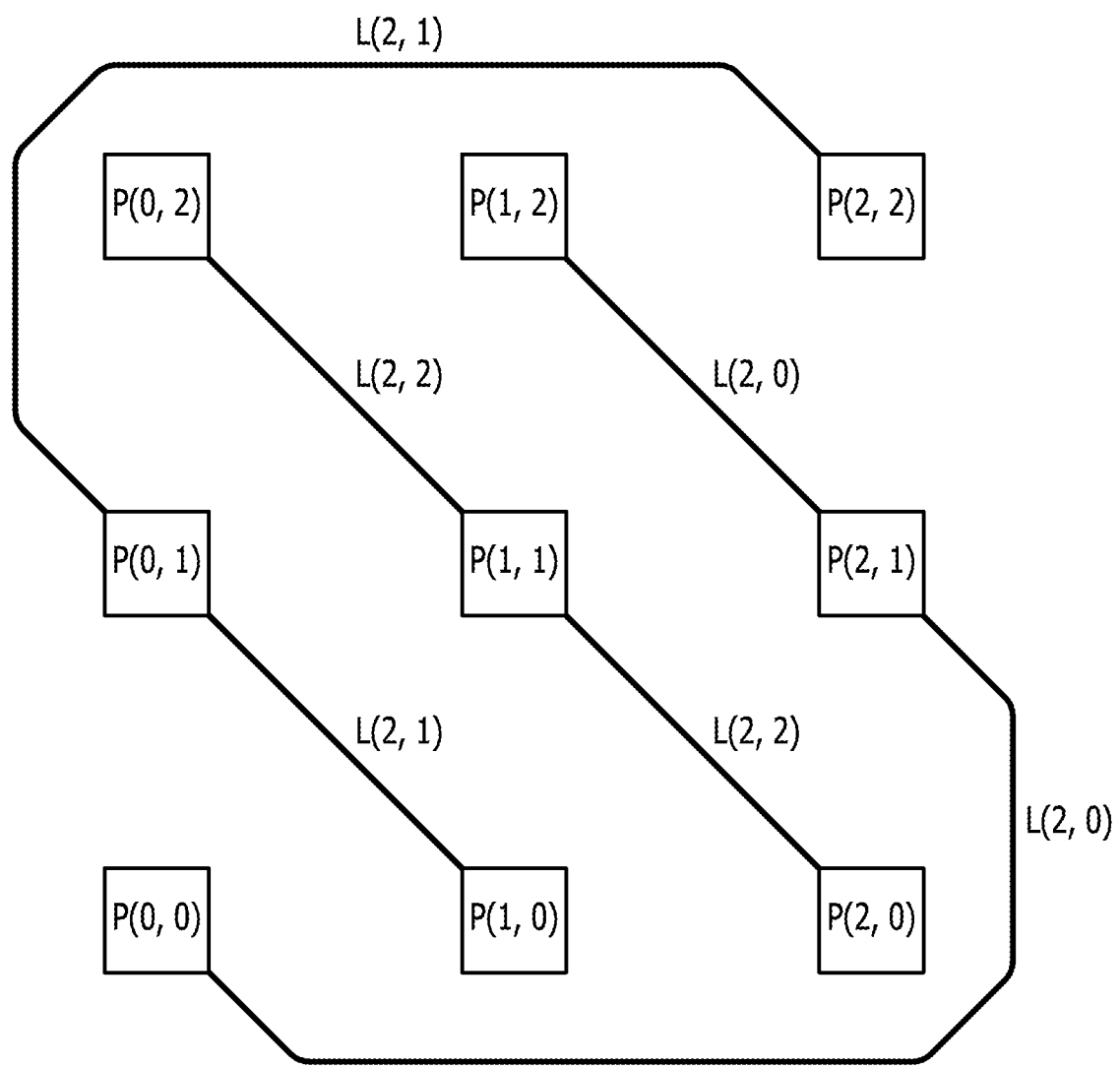
FIG. 20 is a diagram illustrating a correspondence relationship between slope and Spine switch.

For instance, in the case of Leaf switch P(0, 0), as illustrated in FIG. 17, Spine switch L(0) corresponds to a line segment with the slope "∞". As illustrated in FIG. 18, Spine switch L(0, 0) corresponds to a line segment with the slope "0". As illustrated in FIG. 19, Spine switch L(1, 0) corresponds to a line segment with the slope "1". As illustrated in FIG. 20, Spine switch L(2, 0) corresponds to a line segment with the slope "2".

Figure 21:
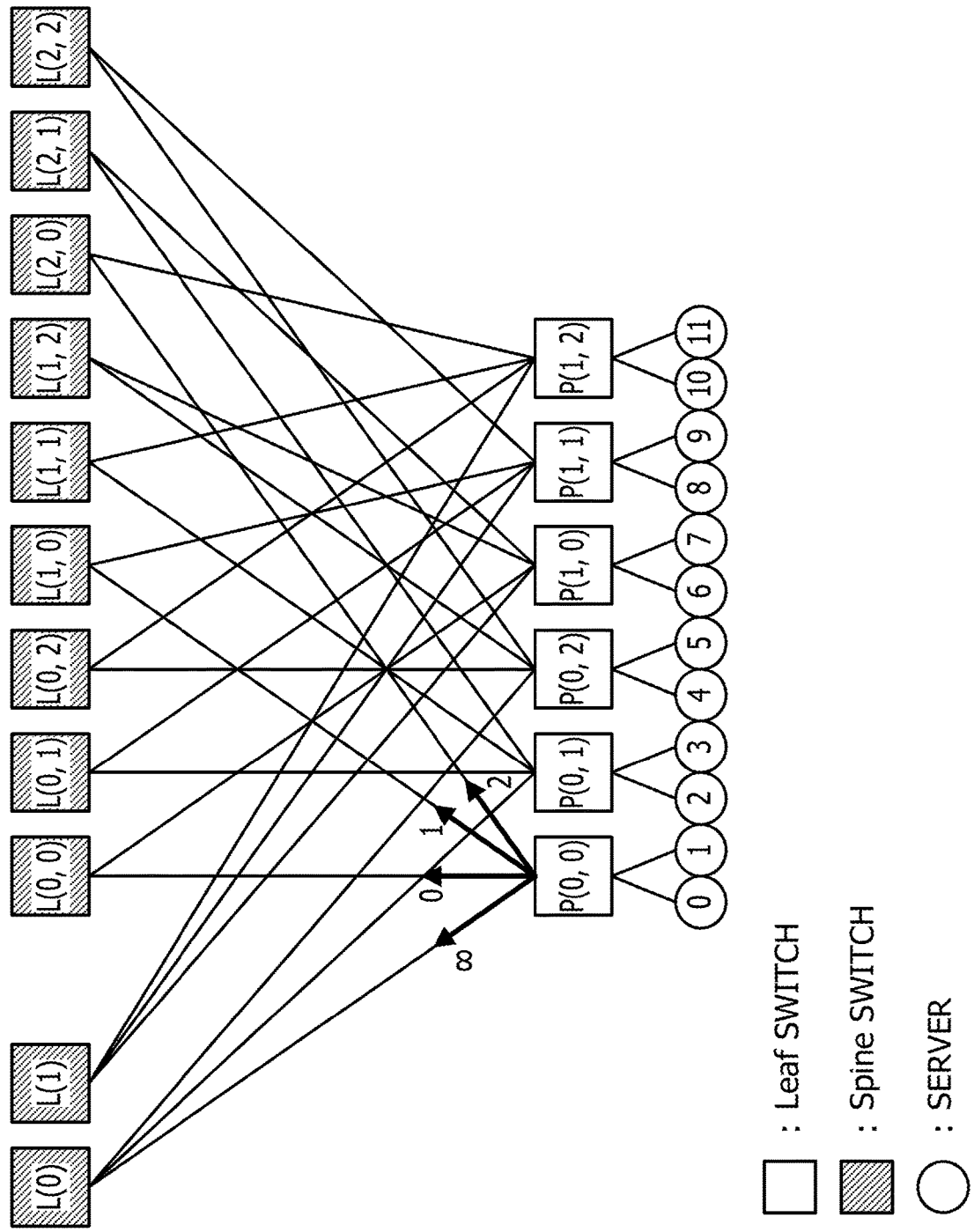
FIG. 21 is a diagram illustrating a correspondence relationship between link and slope.

FIG. 21 is a diagram illustrating a correspondence relationship between link and slope. In FIG. 21, a packet passing through a link with the slope "∞" arrives at Leaf switch P(0, 1) or Leaf switch P(0, 2) through Spine switch L(0). A packet passing through a link with the slope "0" arrives at Leaf switch P(1, 0) through Spine switch L(0, 0). A packet passing through a link with the slope "1" arrives at Leaf switch P(1, 1) through Spine switch L(1, 0). A packet passing through a link with the slope "2" arrives at Leaf switch P(1, 2) through Spine switch L(2, 0).

Thus, when two servers coupled to Leaf switch P(0, 0) transmit packets using different Spine switches, no route conflict occurs for the transmitted packets because of the above-described characteristics of the Latin square fat-tree. The same goes with the links of other Leaf switches (specifically, Leaf switches other than Leaf switch P(0, 0) in the lattice part. Let this constraint be a first constraint for avoiding route conflict in all-to-all communication.

Figure 22:
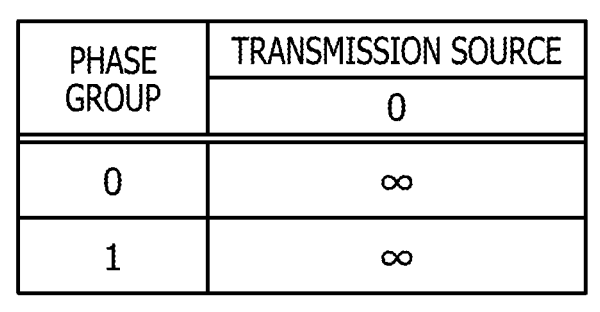

For instance, the following method is provided as a method of generating a communication table so that the first constraint is satisfied. First, slope information on each server is generated as pre-processing for generation of a communication table. Here, a description is given using an example of the server "0" and the server "1" coupled to Leaf switch P(0, 0). For the slope "∞", two other nodes are present, thus as illustrated in FIG. 22, for a phase group 0 and a phase group 1, the slope "∞" is allocated to the server "0". As illustrated in FIG. 23, for phase groups 2, 3, and 4, the slopes "0", "1", and "2" are sequentially allocated to the server "0". Finally, for a phase group 5, the slope "*" is allocated to the server "0". Each phase group includes one or multiple phases. In this manner, for the slope "∞", writing on (n−1) rows is performed, for the slope 0 to slope (n−1), writing on (k−1) rows is performed, and for the slope "*", writing on one row is performed.

The column generated by the above-described processing is shifted in the column direction, and thus the slope information on the server "1" may also be generated. For instance, when shift by two rows is made as illustrated in FIG. 24, in each phase group, the server "0" and the server "1" use different Spine switches. When slope information is generated by this method, no duplication occurs between servers. The reason may be explained in the following manner. Specifically, the row number is nk. The number of shifts with respect to the leftmost column is sequentially 0, n−1, 2(n−1), 3(n−1), . . . , and (m−1)(n−1). For the slope "∞", no duplication occurs from the shift by (n−1) rows to the shift by (nk−(n−1)) rows because the number of rows is (n−1). For the slope other than "∞" and "*", no duplication occurs from the shift by (k−1) rows to the shift by (nk−(k−1)) rows because the number of rows is (k−1). Thus, when no duplication occurs for the slope "∞", the first constraint is satisfied. For the slope "*", even if duplication occurs, no problem arises. Then, (m−1)(n−1)<nk−(n−1) is satisfied.

Figure 25:
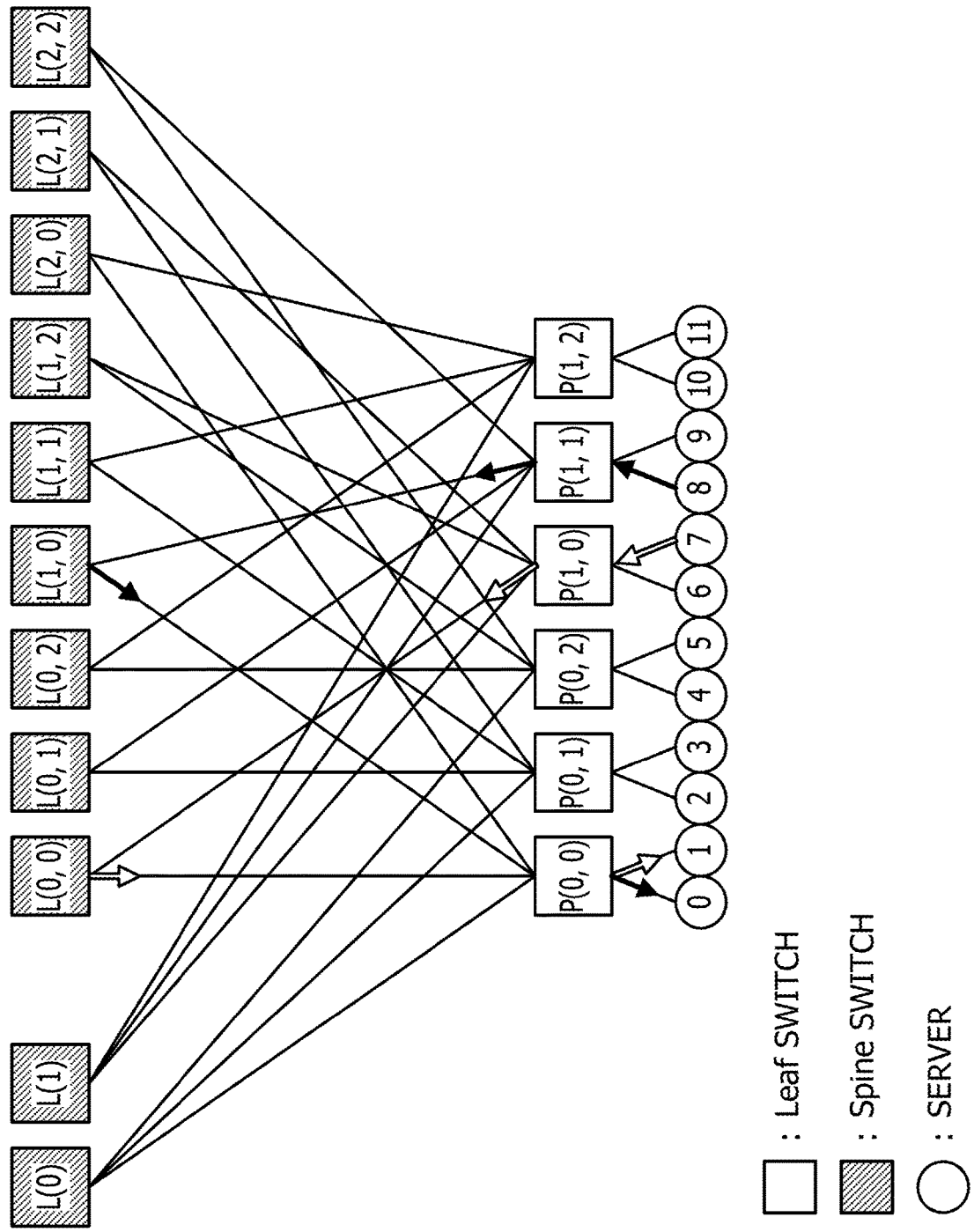
FIG. 25 is a diagram for explaining a method of generating a communication table.
Figure 26:
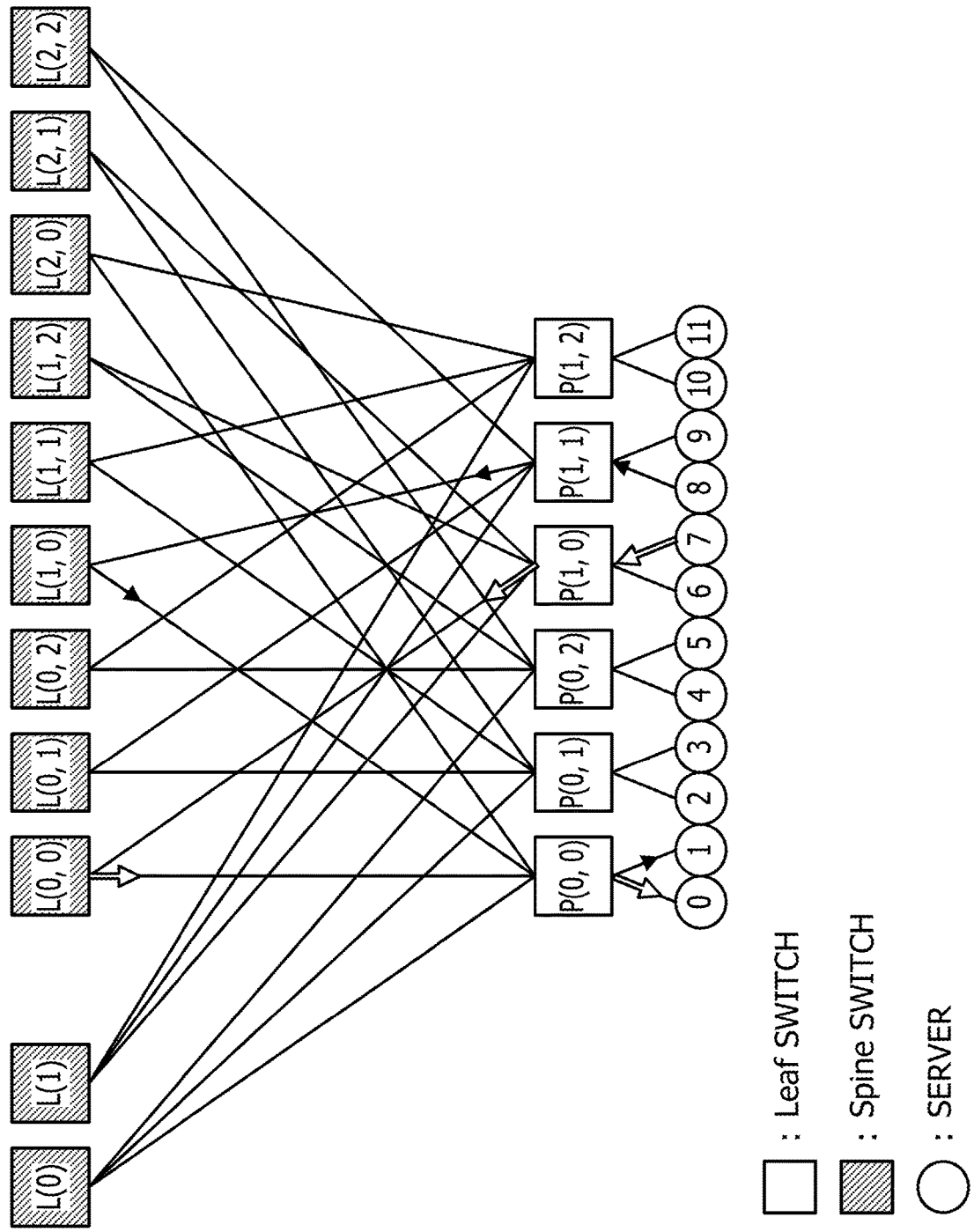
FIG. 26 is a diagram for explaining a method of generating a communication table.

Although the first constraint is constraint on transmission from a transmission source server to Leaf switch coupled to a destination server, there is also constraint on from Leaf switch coupled to a destination server to the destination server. For instance, as illustrated in FIGS. 25 and 26, it is assumed that in a phase group, server "7" and server "8" transmit a packet to the servers coupled to Leaf switch P(0, 0). In this case, server "7" and server "8" transmit a packet to server "0" and server "1", thus if the phase group does not have two phases, transmission without an occurrence of route conflict is not achieved. Let this constraint be a second constraint for avoiding route conflict in all-to-all communication.

Figure 28:
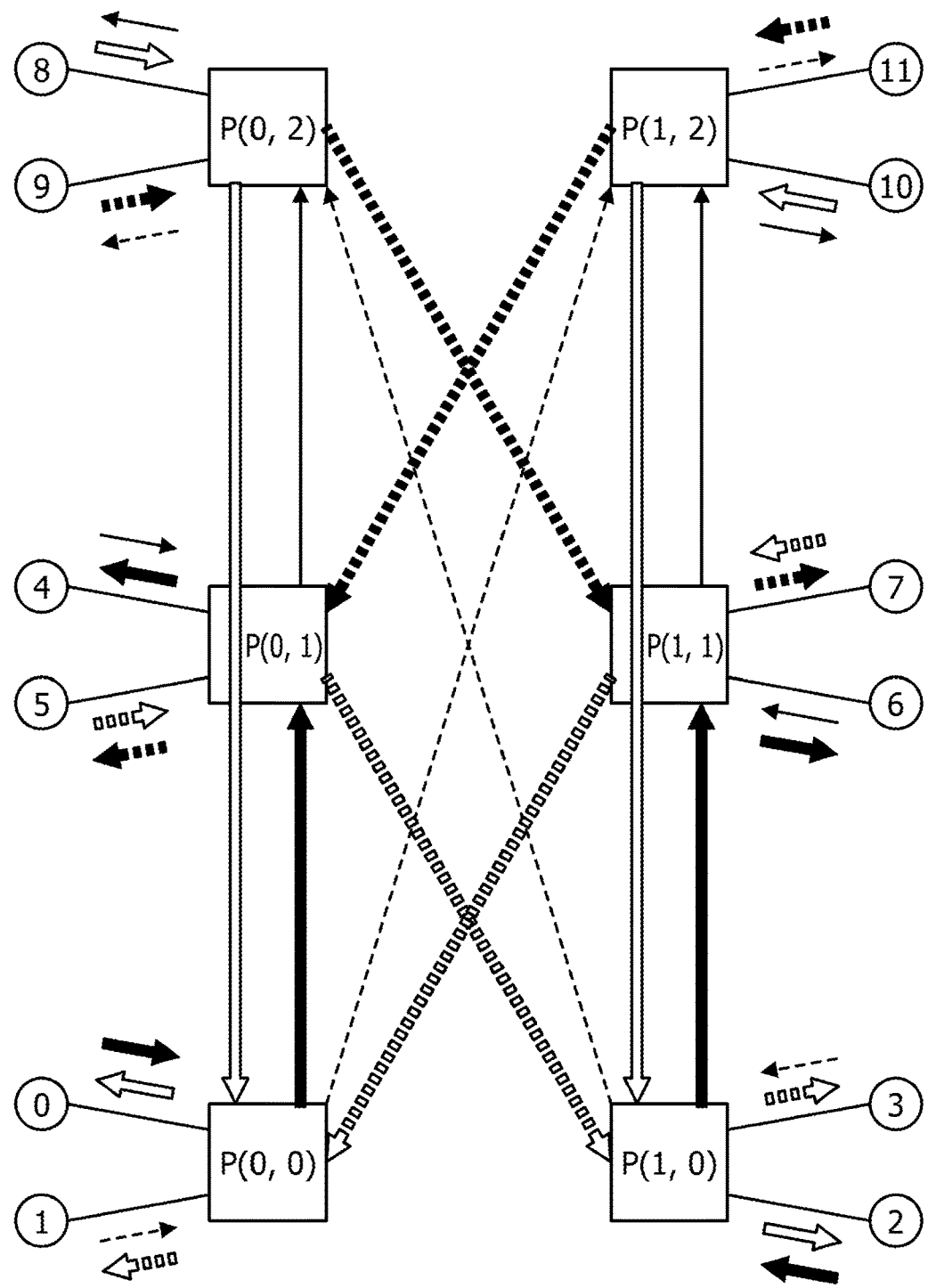
FIG. 28 is a diagram illustrating communication in a specific phase.

A communication table for all-to-all communication for n*k*m phases may be generated, for instance, as illustrated in FIG. 27 based on the first constraint and the second constraint. In the example of FIG. 27, the communication table stores information on phase group, phase numbers in each phase group, phase serial numbers, and numbers of destination servers. In each row, each of the numbers from 0 to 11 appears just once. Also, in each column, each of the numbers from 0 to 11 appears just once. Therefore, all-to-all communication is achieved by the communication table illustrated in FIG. 27. As an example, communication in phase 0 is illustrated in FIG. 28. As illustrated in FIG. 28, multiple packets are not transmitted at the same time over any route in the same direction, thus no route conflict occurs.

The above-described method of generating a communication table is an example, and as long as the first constraint and the second constraint are satisfied, a communication table may be generated by another method. Also, the format of the communication table illustrated in FIG. 27 is an example, and a communication table in another format may be generated.

Returning to the description of FIG. 14, the communication table generation unit 301 stores the communication table generated in step S21 in the communication table storage unit 303 (step S23). Then the processing returns to the calling source.

The communication table generated by the above-described processing may achieve all-to-all communication in which not route conflict occurs.

Returning to the description of FIG. 8, the communication unit 302 transmits the communication table stored in the communication table storage unit 303 to each relevant execution server (step S9). It is to be noted that in step S9, identification information of the job specified in the allocation request is also transmitted to the execution server.

Each execution server, which has received a communication table, performs all-to-all communication in accordance with the communication table. The processing executed by the execution server will be described later.

Subsequently, when all-to-all communication by the execution server is completed, the allocation unit 300 registers "FALSE" in the management data storage unit 304 in association with the columns allocated to the job in step S5 (step S11). The processing is then completed. When the processing in step S11 is performed, for instance, allocation management data as illustrated in FIG. 9 is stored in the management data storage unit 304.

Figure 29:
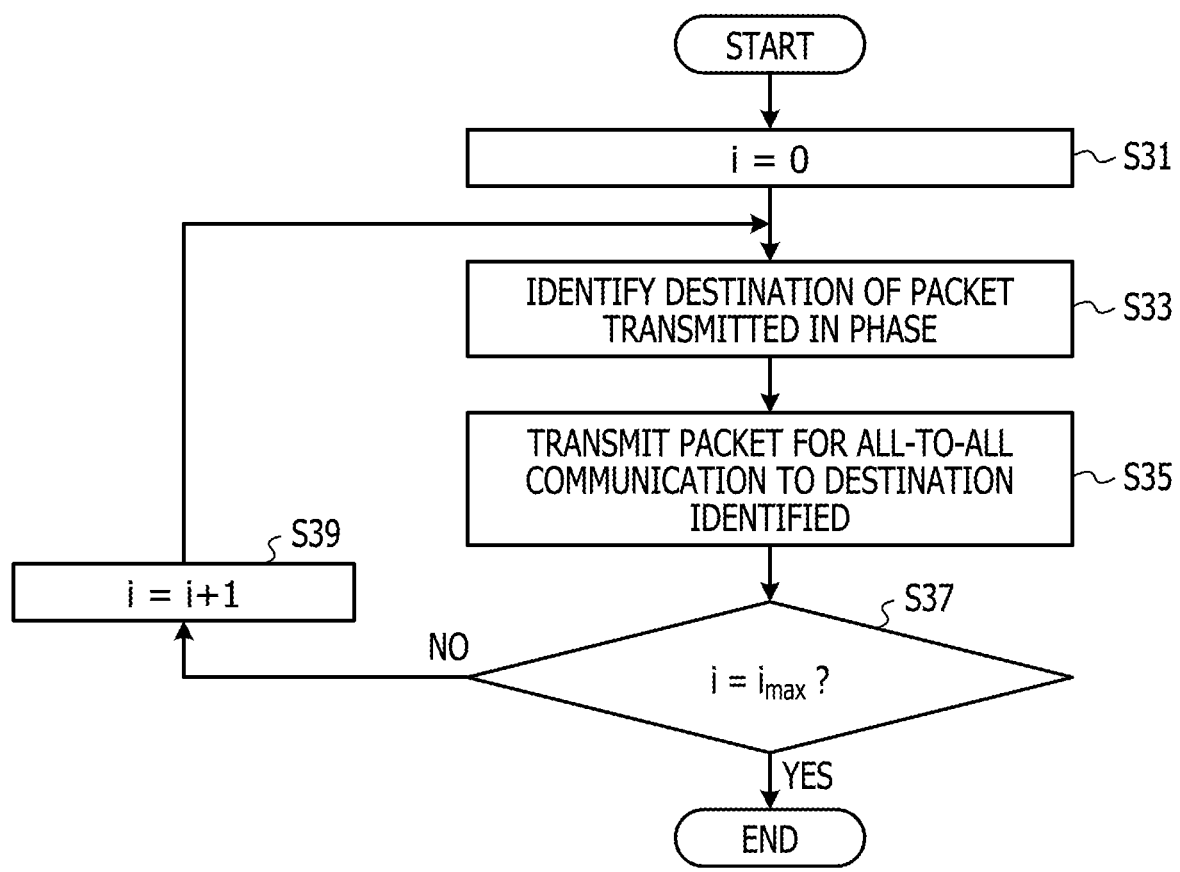
FIG. 29 is a flowchart illustrating the processing flow of processing executed by an execution server.

Next, the processing executed by an execution server will be described. FIG. 29 is a flowchart illustrating the processing flow of processing executed by an execution server.

The communication unit 101 in a server assigns 0 to variable i which indicates a phase number (step S31 in FIG. 29).

The communication unit 101 identifies the destination of a packet transmitted by the communication unit 101 in phase i based on the communication table stored in the communication table storage unit 103 and the identification information (a number assigned to the server, for instance, when the communication table illustrated in FIG. 27 is used) of the server (step S33). The execution server recognizes the job to be executed based on the identification information of the job sent along with the communication table.

The communication unit 101 transmits a packet for all-to-all communication to the destination identified in step S33 (step S35).

The communication unit 101 determines whether $i=i_{max}$ is satisfied (step S37). Here, $i_{max}$ is a maximum value of the phase serial number of all-to-all communication performed in accordance with the communication table. When $i=i_{max}$ is not satisfied (No route in step S37), the communication unit 101 increments i by one (step S39). The processing then proceeds to step S33. Completion of a phase is identified by barrier synchronization.

On the other hand, when $i=i_{max}$ is satisfied (Yes route in step S37), the processing is completed.

As described above, when allocation to a job is made column by column in the lattice part, no link is shared, and thus it is possible to achieve a state where no route conflict occurs between jobs. Even when the timing of all-to-all communication of a certain job and the timing of all-to-all communication of another job are not properly adjusted, no route conflict occurs, and it is possible to execute each job independently.

Also, in all-to-all communication performed in each job, when a communication table as described above is used, no route conflict occurs.

Therefore, in the embodiment, it is possible to execute multiple jobs in the Latin square fat-tree system 1000 without reducing the throughput.

Second Embodiment

In a second embodiment, allocation management data different from the allocation management data in the first embodiment is used, and allocation of each column in the lattice part is managed.

Figure 30:
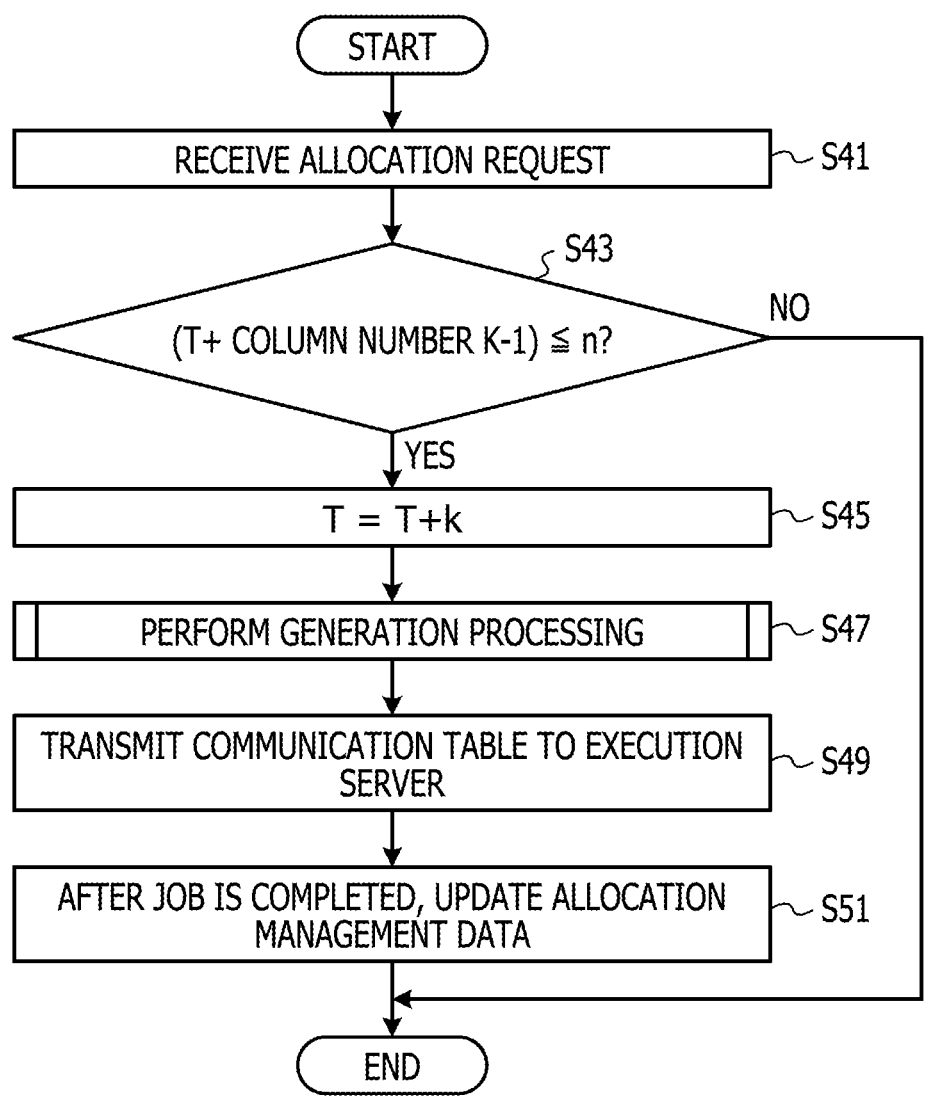
FIG. 30 is a flowchart illustrating the processing flow of processing executed by a management apparatus in a second embodiment.

FIG. 30 is a flowchart illustrating the processing flow of processing executed by a management apparatus 3 in the second embodiment.

An allocation unit 300 in the management apparatus 3 receives an allocation request from a user (step S41 in FIG. 30). The allocation request is a request of allocation of resources to a job, and for instance, information s on the number of servers is included as a parameter. k*m is calculated by dividing s by the order n, and k and m are identified so that a condition (here, $1 \leq k \leq n$, $1 \leq m \leq n$, and $k \geq m$) is satisfied. A parameter k expresses the number of columns allocated to a job among the columns in the lattice part, and a parameter m represents the number of servers involved in all-to-all communication among the servers coupled to the Leaf switches. It is to be noted that k and m may be contained in the allocation request as parameters.

The allocation unit 300 refers to the allocation management data stored in the management data storage unit 304, and determines whether $(T+k-1) \leq n$ is satisfied (step S43). T is the value contained in the allocation management data stored in the management data storage unit 304, and indicates the number of a column to be allocated next. $(T+k-1) \leq n$ indicates the presence of a column which has not been allocated.

Figure 31:
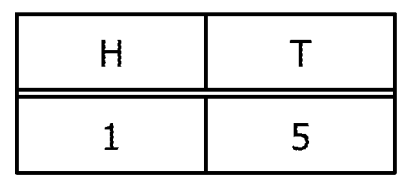
Figure 32:
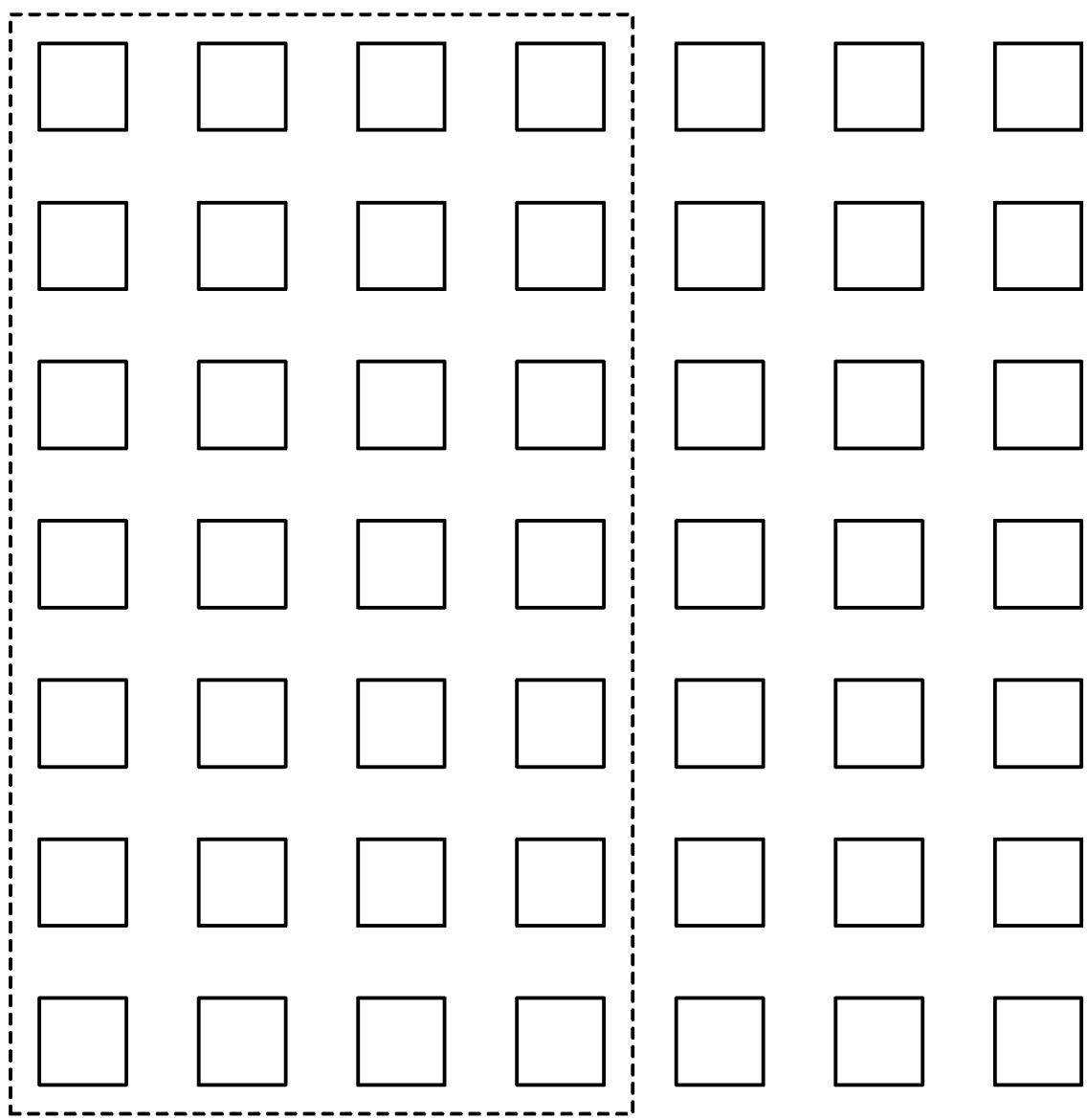
FIG. 32 is a diagram illustrating a state of allocation.

FIG. 31 is a table illustrating example allocation management data stored in the management data storage unit 304 in the second embodiment. In the example of FIG. 31, of the columns already allocated to a job, value H indicating the column at the head, and T indicating the number of a column to be allocated next are stored. For instance, when the size of the lattice part is 7*7 and from the first row to the fourth row are already allocated as illustrated in FIG. 32, H=1 and T=5. In this manner, the allocation management data in the second embodiment is managed in the form of queue.

When $(T+k-1) \leq n$ is not satisfied (in other words, an unallocated column does not exist) (No Route in step S43), it is not possible to execute the job specified in the allocation request, thus the processing is terminated.

Figure 33:
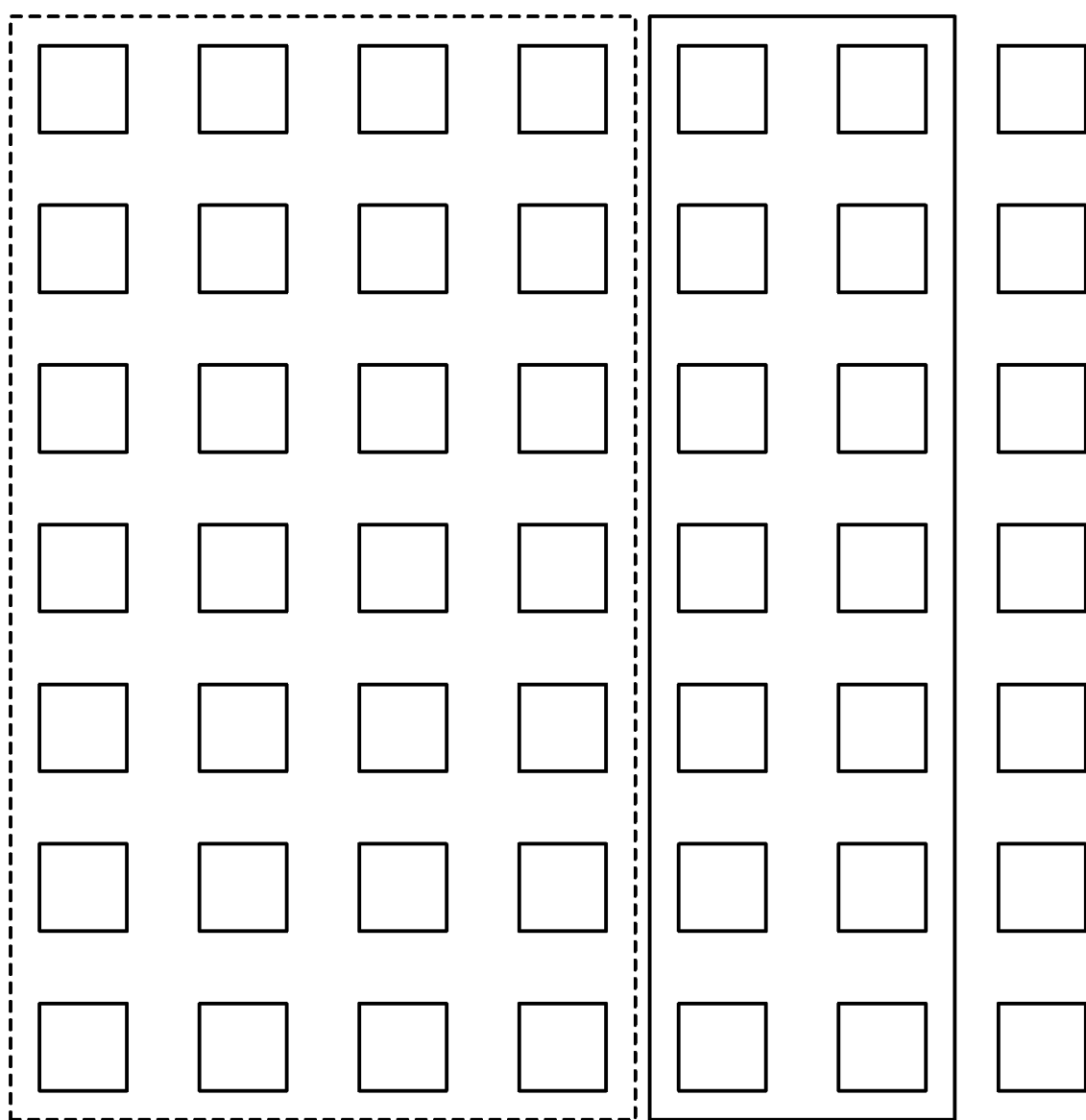
FIG. 33 is a diagram illustrating a state of allocation.
Figure 34:
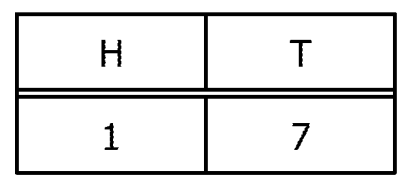

On the other hand, when $(T+k-1) \leq n$ is satisfied (Yes route in step S43), the allocation unit 300 executes the following processing. Specifically, the allocation unit 300 updates T stored in the management data storage unit 304 to T+k (step S45). For instance, when k=2, the state of allocation is as illustrated in FIG. 33. Then, the allocation management data illustrated in FIG. 34 is stored in the management data storage unit 304.

The communication table generation unit 301 performs generation processing to generate a communication table based on a result of allocation made by the allocation unit 300 and information on a network topology of the Latin square fat-tree system 1000 stored in the topological data storage unit 305 (step S47). The generation processing in the second embodiment is the same as the generation processing in the first embodiment, thus a detailed description is omitted.

The communication unit 302 transmits the communication table stored in the communication table storage unit 303 to each relevant execution server (step S49). It is to be noted that in step S49, identification information of the job specified in the allocation request is also transmitted to the execution server.

Each execution server, which has received a communication table, performs all-to-all communication in accordance with the communication table. The processing executed by the execution server is as described in the first embodiment.

Figure 35:
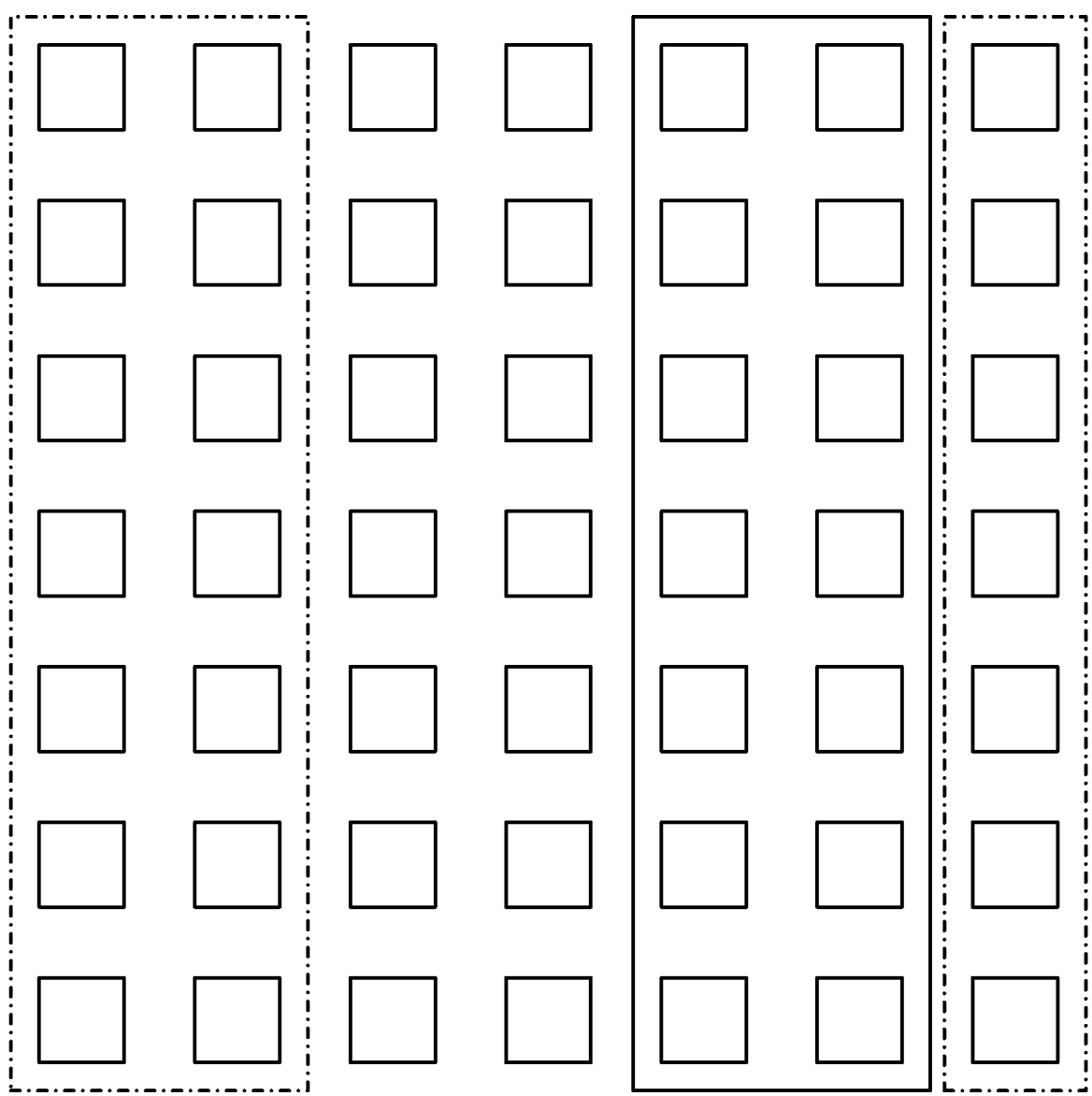
FIG. 35 is a diagram illustrating a state of allocation.
Figure 36:
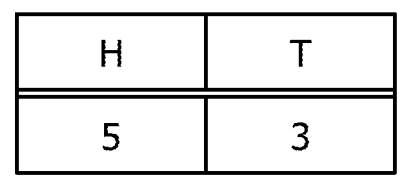
Figure 37:
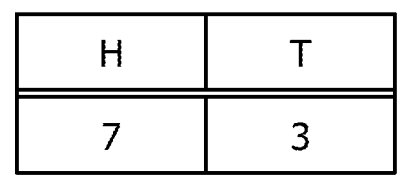

Subsequently, when all-to-all communication by the execution server is completed, the allocation unit 300 updates the allocation management data so that allocation made in step S45 is canceled (step S51). The processing is then completed. At the point when all-to-all communication by the execution server is completed, for instance, when the fifth column to the seventh column, and the first column and the second column are allocated as illustrated in FIG. 35, the allocation management data is updated from the state illustrated in FIG. 36 to the state illustrated in FIG. 37.

As described above, when allocation to a job is made column by column in the lattice part, no link is shared, and thus it is possible to achieve a state where no route conflict occurs between jobs. Even when the timing of all-to-all communication of a certain job and the timing of all-to-all communication of another job are not properly adjusted, no route conflict occurs, and it is possible to execute each job independently.

Also, in all-to-all communication performed in each job, when a communication table as described above is used, no route conflict occurs.

Therefore, in the embodiment, it is possible to execute multiple jobs in the Latin square fat-tree system 1000 without reducing the throughput.

The method in the embodiment is suitable for the case where multiple continuous columns are preferably allocated to each job.

Although the embodiment of the present disclosure has been described above, the present disclosure is not limited to this. For instance, the above-described functional block configuration of the management apparatus 3 and the server may not match actual program module configuration.

Also, the above-described configuration of each table is an example, and each table does not have to have the configuration as described above. In addition, in the processing flow, the sequence of steps of processing may be changed as long as the same processing result is obtained. Furthermore, some steps of processing may be performed concurrently.

APPENDIX

In the appendix, the Latin square fat-tree and the finite projective plane will be described.

Figure 38:
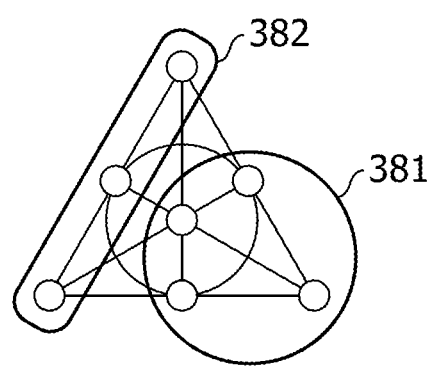
FIG. 38 is a diagram for explaining a Latin square fat-tree and a finite projective plane.

The finite projective plane is a plane such that some points at infinity are added to a normal plane and "two parallel lines" no longer exists. FIG. 38 illustrates the structure of a finite projective plane when the order (hereinafter let n be the order) is 2, and the port number is 6 (=2(n+1)). In FIG. 38, 3 (=n+1) Leaf switches surrounded by frame 382 correspond to the points at infinity.

In a finite projective plane, one point P is set, n points P(c) (c=0, 1, . . . , n−1) are set, and $n^2$ points P(c, r) (c, r=0, 1, . . . , n−1) are set. Also, one line L={P, P(0), . . . , P(n−1)} is set, n lines L={P, P(c, 0), . . . , P(c, n−1)} (c=0, 1, . . . , n−1) are set, and $n^2$ lines L(c, r)={P(c) and P (i, (r+ci) mod n)} (i, c, r=0, 1, . . . , n−1) are set.

The characteristics of a finite projective plane is that ($n^2$+n+1) points are present, and the number of lines is ($n^2$+n+1). Any two lines intersect at one point, and for any two points, there exists only one line that connects the two points. However, there is a constraint that n a prime number.

Figure 39A:
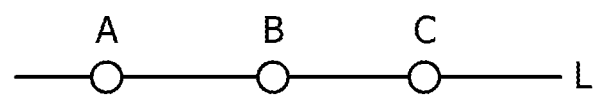
FIGS. 39A and 39B are diagrams for explaining a Latin square fat-tree and a finite projective plane.
Figure 39B:
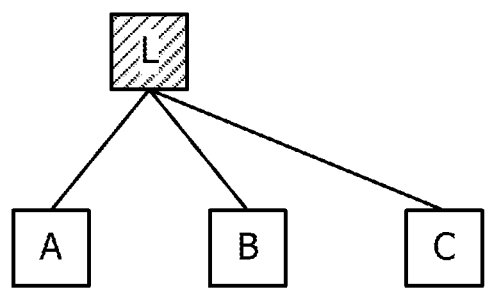

The structure of a finite projective plane may be replaced by a topological structure. For instance, the structure of a finite projective plane illustrated in FIG. 39A may be replaced by the topological structure illustrated in FIG. 39B. In FIG. 39A, a line represents a Spine switch, and each point represents a Leaf switch. In FIG. 39B, each hatched rectangle represents a Spine switch, and each unhatched rectangle represents a Leaf switch.

Figure 40A:
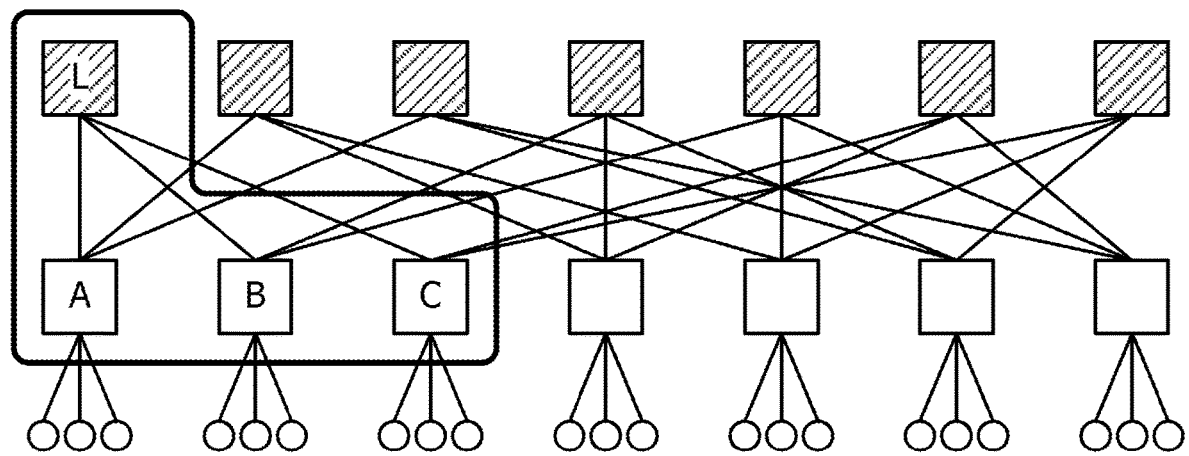
FIGS. 40A and 40B are diagrams for explaining a Latin square fat-tree and a finite projective plane.
Figure 40B:
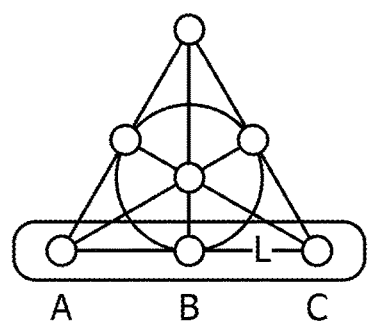

The topological structure illustrated in FIG. 40A is the topological structure of the Latin square fat-tree in which the number of Spine switches is seven and the number of Leaf switches is seven. The topological structure illustrated in FIG. 40A corresponds to the structure of the finite projective plane illustrated in FIG. 40B. The topological structure of the portion surrounded by a thick line in FIG. 40A is the same as the topological structure of FIG. 39B. Also, the topological structure of the portion surrounded by a thick line in FIG. 40B is the same as the topological structure of the portion surrounded by a thick line in FIG. 40A.

Figure 41:
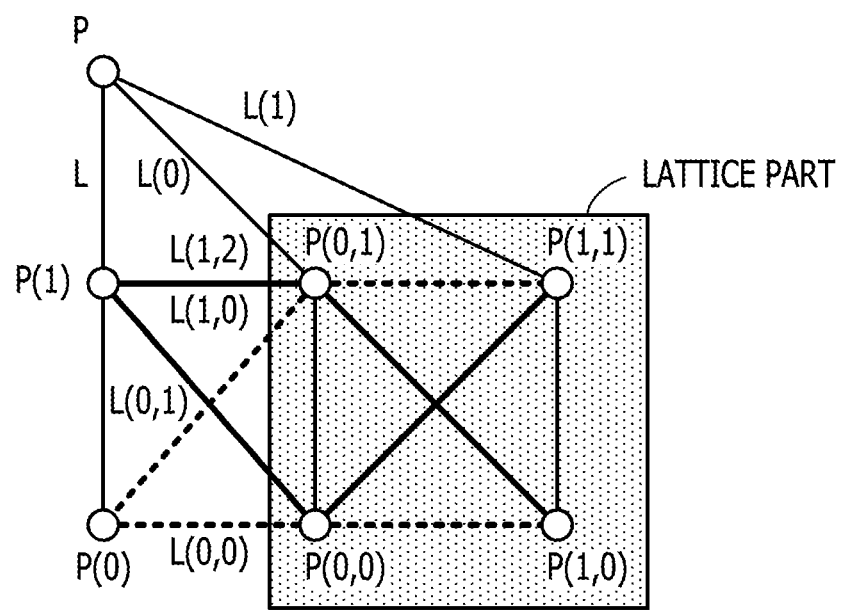
FIG. 41 is a diagram for explaining a Latin square fat-tree and a finite projective plane.

The structure illustrated in FIG. 38 may be converted to the structure illustrated in FIG. 41. In FIG. 41, 4 (=n*n) Leaf switches included in hatched lattice part correspond to 4 Leaf switches included in the portion surrounded by frame 381 in FIG. 38. A parallel line group in the lattice part is converted so that parallel lines intersect at an added point. In other words, lines with the same slope are converted so as to intersect.

The appendix is completed here.

Figure 42:
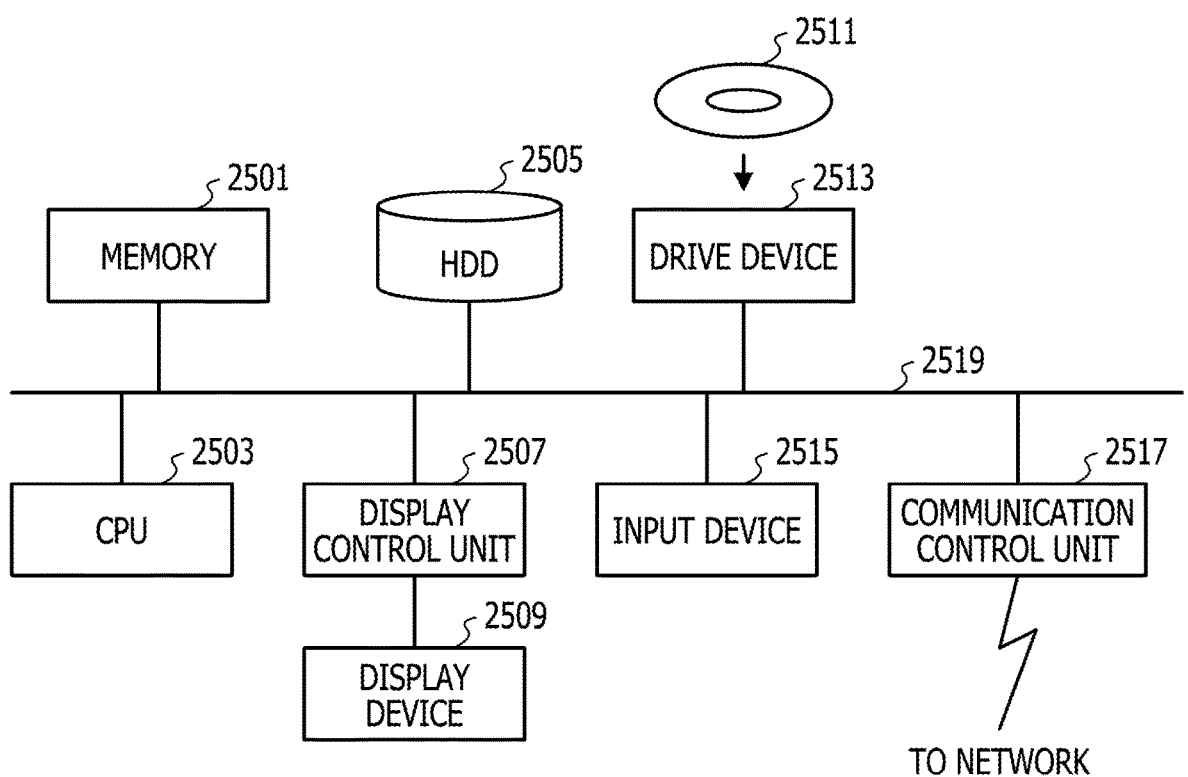
FIG. 42 is a functional block diagram of a computer.

The above-described management apparatus 3 and server are each a computer apparatus, and as illustrated in FIG. 42, the memory 2501, the CPU 2503, the HDD 2505, and a display control unit 2507 coupled to the display device 2509, a drive device 2513 for a removable disk 2511, an input device 2515, and a communication control unit 2517 for coupling to a network are coupled to each other via a bus 2519. An operating system (OS) and an application program for performing the processing in the embodiment are stored in the HDD 2505, and read from the HDD 2505 to the memory 2501 when executed by the CPU 2503. The CPU 2503 controls and causes the display control unit 2507, the communication control unit 2517, and drive device 2513 to perform predetermined operations according to the details of the processing of the application program. Also, data during processing is mainly stored in the memory 2501, but may be stored in the HDD 2505. In the embodiments of the present disclosure, the application program to execute the above-described processing is stored in the computer-readable removable disk 2511 and distributed, then is installed from the drive device 2513 to the HDD 2505. The application program may be installed to the HDD 2505 through a network such as the Internet and the communication control unit 2517. Such computer apparatuses implement various functions as described above by organic cooperation between the aforementioned hardware such as the CPU 2503, the memory 2501, and programs such as the OS and the application program.

Figure 43:
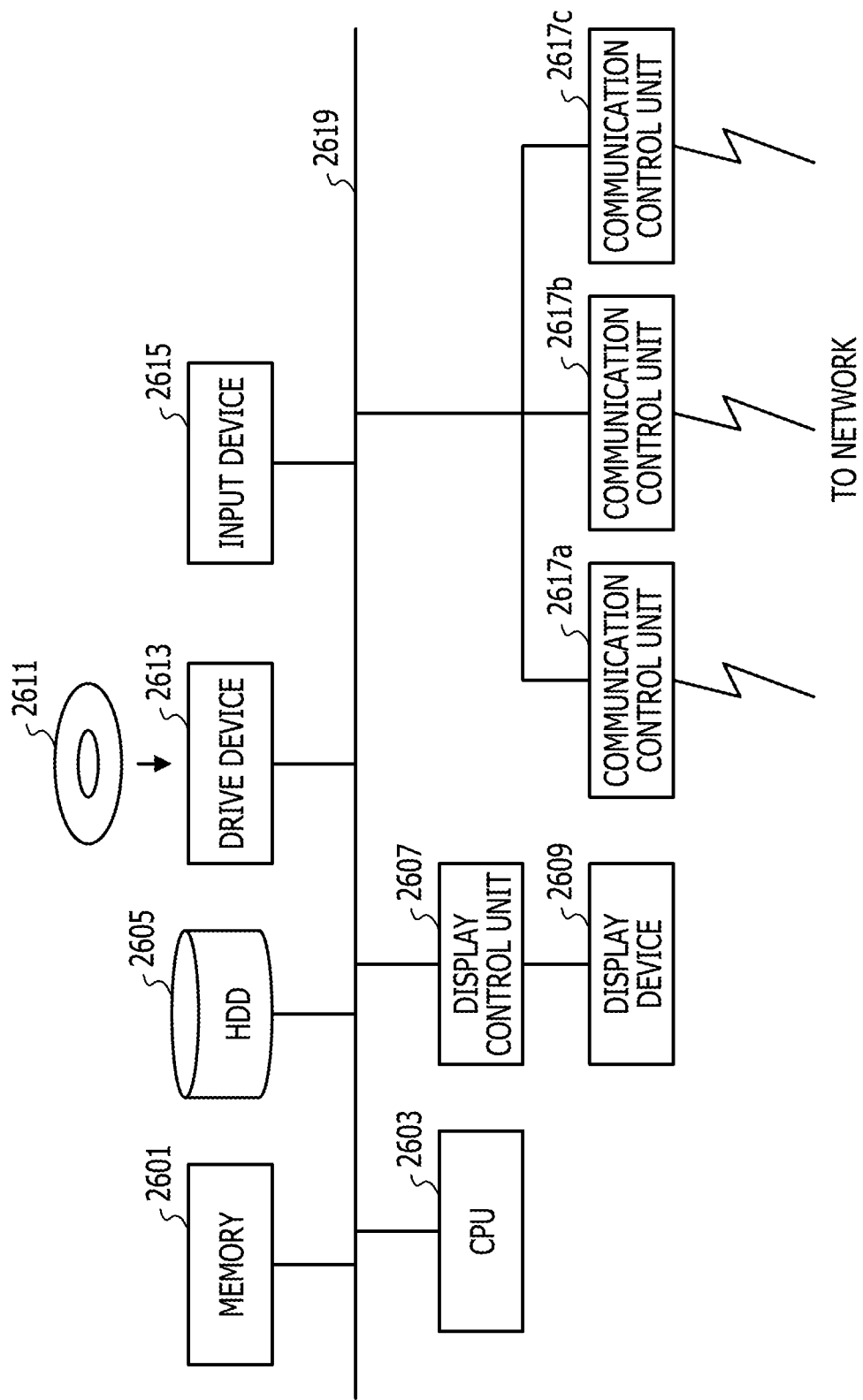
FIG. 43 is a functional block diagram of a switch.

As illustrated in FIG. 43, the Leaf switches and Spine switches described above may have a configuration in which the memory 2601, the CPU 2603, the HDD 2605, and a display control unit 2607 coupled to the display device 2609, a drive device 2613 for a removable disk 2611, an input device 2615, and a communication control units 2617 (2617a to 2617c in FIG. 43) for coupling to a network are coupled to each other via a bus 2619. Depending on conditions, the display control unit 2607, the display device 2609, the drive device 2613, and input device 2615 may not be included. The operating system and the application program to execute the processing in the embodiments are stored in the HDD 2605, and are read from the HDD 2605 to the memory 2601 when executed by the CPU 2603. As appropriate, the CPU 2603 controls and causes the display control unit 2607, the communication control units 2617, and the drive device 2613 to perform a desired operation. It is to be noted that data inputted via one of the communication control units 2617 is outputted via another one of the communication control units 2617. The CPU 2603 controls the communication control units 2617 and switches between output ports appropriately. Also, data during processing is stored in the memory 2601, and is stored in the HDD 2605 as appropriate. In the embodiments of the present technology, the application program to execute the above-described processing is stored in the computer-readable removable disk 2611 and distributed, then is installed from the drive device 2613 to the HDD 2605. The application program may be installed to the HDD 2605 through a network such as the Internet and the communication control unit 2617. Such computer apparatuses implement various functions as described above by organic cooperation between the aforementioned hardware such as the CPU 2603, the memory 2601, and the OS and a desired application program.

The embodiments of the present disclosure described above are summarized as follows.

The information processing system according to a first aspect of the embodiment includes: (A) multiple spine switches (the Spine switch in the embodiment is an example of the aforementioned spine switch); (B) multiple leaf switches coupled to the multiple spine switches in the Latin square fat-tree topology (the Leaf switch in the embodiment is an example of the aforementioned leaf switches); (C) multiple information processing apparatuses, each of which is coupled to one of the multiple leaf switches (the server in the embodiment is an example of the aforementioned information processing apparatuses); and (D) a management apparatus that manages communication of the multiple information processing apparatuses (the management apparatus 3 in the embodiment is an example of the aforementioned management apparatus). The management apparatus includes: the allocation unit (the allocation unit 300 in the embodiment is an example of the allocation unit) that (d1) allocates the first leaf switch group, to the first job, which corresponds to one or multiple first columns among the multiple columns in the lattice part including points other than the points at infinity of a finite projective plane corresponding to a Latin square fat-tree, and allocates the second leaf switch group, to the second job, which corresponds to one or multiple second columns different from the one or multiple first columns among the multiple columns; and a transmission unit (the communication unit 302 in the embodiment is an example of the aforementioned transmission unit) that (d2) transmits schedule information on all-to-all communication of the first job to each information processing apparatus coupled to the first leaf switch group, and transmits schedule information on all-to-all communication of the second job to each information processing apparatus coupled to the second leaf switch group.

It is possible to achieve a state where no route conflict occurs between all-to-all communication of the first job and all-to-all communication of the second job due to the characteristics of the structure of the Latin square fat-tree.

Also, the allocation unit (d11) may identify the first leaf switch group and the second leaf switch group based on an array having elements which are values indicating whether or not leaf switch groups corresponding to the columns in the lattice part are allocated to a job, the first leaf switch group and the second leaf switch group being among the leaf switch groups which have not been allocated to the job.

Allocation of a leaf switch group to a job may be made in a flexible manner.

Also, the allocation unit (d12) may identify the first leaf switch group and the second leaf switch group based on a queue for managing allocation of multiple leaf switch groups corresponding to the multiple columns in the lattice part to a job, the first leaf switch group and the second leaf switch group being among the multiple leaf switch groups unallocated.

It is possible to allocate continuous areas in the lattice part on the finite projective plane to each job by utilizing the above-described queue.

Also, each of the information processing apparatuses coupled to the first leaf switch group (C1) performs all-to-all communication of the first job in accordance with received schedule information on all-to-all communication of the first job, and each of the information processing apparatuses coupled to the second leaf switch group (C2) performs all-to-all communication of the second job in accordance with received schedule information on all-to-all communication of the second job.

Since the communication information generated by the management apparatus that manages communication of multiple information processing apparatuses is used, it is possible to appropriately perform all-to-all communication on the whole without an error in the timing of packet transmission.

Also, each of the information processing apparatuses coupled to the first leaf switch group (C11) may transmit a packet using a spine switch different from spine switches used by other information processing apparatuses coupled to the same leaf switch, in each of phases of all-to-all communication of the first job, and each of the information processing apparatuses coupled to the second leaf switch group (C21) may transmit a packet using a spine switch different from spine switches used by other information processing apparatuses coupled to the same leaf switch, in each of phases of all-to-all communication of the second job.

It is possible to avoid an occurrence of route conflict in all-to-all communication of the first job and avoid an occurrence of route conflict in all-to-all communication of the second job.

The information processing method according to a second aspect of the embodiment is performed by an information processing system that includes: multiple spine switches; multiple leaf switches coupled to the multiple spine switches in the Latin square fat-tree topology; multiple information processing apparatuses, each of which is coupled to one of the multiple leaf switches; and a management apparatus that manages communication of the multiple information processing apparatuses. The information processing method includes: (E) allocating the first leaf switch group, to the first job, which corresponds to one or multiple first columns among the multiple columns in the lattice part including points other than the points at infinity of a finite projective plane corresponding to a Latin square fat-tree; (F) allocating the second leaf switch group, to the second job, which corresponds to one or multiple second columns different from the one or multiple first columns among the multiple columns; (G) transmitting schedule information on all-to-all communication of the first job to each information processing apparatus coupled to the first leaf switch group; and (H) transmitting schedule information on all-to-all communication of the second job to each information processing apparatus coupled to the second leaf switch group.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system comprising:
   a plurality of spine switches;
   a plurality of information processing apparatuses;
   a plurality of leaf switches each which couples the plurality of information processing apparatuses and the plurality of spine switches in a Latin square fat-tree topology; and
   a processor configured to control communication between the plurality of information processing apparatuses, wherein the processor is configured to:
      allocate a first leaf switch group of the plurality of leaf switches to a first job, the first leaf switch group corresponding to a first column of a plurality of columns in a lattice part including points other than points at infinity of a finite projective plane corresponding to the Latin square fat-tree, and allocate a second leaf switch group of the plurality of leaf switches to a second job, the second leaf switch group corresponding a second column different from the first column of the plurality of columns; and
      transmit first schedule information on first communication related to the first job to a first information processing apparatus included in the plurality of information processing apparatuses coupled to the first leaf switch group, and transmit second schedule information on second communication related to the second job to a second information processing apparatus included in the plurality of information processing apparatuses coupled to the second leaf switch group, wherein the first communication and the second communication are collective communication in which each of the plurality of information processing apparatuses communicates with other information processing apparatuses.

2. The information processing system according to claim 1, wherein the processor is configured to: identify the first leaf switch group and the second leaf switch group based on an array having elements which are values indicating whether a plurality of leaf switch groups corresponding to the plurality of columns in the lattice part are allocated to a job, the first leaf switch group and the second leaf switch group being among the plurality of leaf switch groups which have not been allocated to the job.

3. The information processing system according to claim 1, wherein the processor is configured to: identify the first leaf switch group and the second leaf switch group based on a queue for managing allocation of a plurality of leaf switch groups corresponding to the plurality of columns in the lattice part to a job, the first leaf switch group and the second leaf switch group being among the plurality of leaf switch groups which have not been allocated to the job.

4. The information processing system according to claim 1, wherein each of the plurality of information processing apparatuses coupled to the first leaf switch group performs the first communication of the first job based on the first schedule information, and each of the plurality of information processing apparatuses coupled to the second leaf switch group performs the second communication of the second job based on the second schedule information.

5. The information processing system according to claim 4, wherein each of the plurality of information processing apparatuses coupled to the first leaf switch group transmits a first packet using one of the plurality of spine switches different from part of the plurality of spine switches used by other information processing apparatuses coupled to the leaf switch in common, in each of phases of the first communication, and each of the plurality of information processing apparatuses coupled to the second leaf switch group transmits a second packet using one of the plurality of spine switches different from part of the plurality of spine switches used by other information processing apparatuses coupled to the leaf switch in common, in each of phases of the second communication.

6. The information processing system according to claim 1, wherein the first communication and the second communication are the collective communication in which each of the plurality of information processing apparatuses communicates with all other information processing apparatuses.

7. A method using an information processing system including a plurality of spine switches, a plurality of information processing apparatuses, a plurality of leaf switches each which couples the plurality of information processing apparatuses and the plurality of spine switches in a Latin square fat-tree topology; and a processor configured to control communication between the plurality of information processing apparatuses, the method comprising:
   allocating, by the processor, a first leaf switch group of the plurality of leaf switches to a first job, the first leaf switch group corresponding to a first column of a plurality of columns in a lattice part including points other than points at infinity of a finite projective plane corresponding to the Latin square fat-tree, and allocate a second leaf switch group of the plurality of leaf switches to a second job, the second leaf switch group corresponding a second column different from the first column of the plurality of columns; and
   transmitting, by the processor, first schedule information on first communication related to the first job to a first information processing apparatus included in the plurality of information processing apparatuses coupled to the first leaf switch group, and second schedule information on second communication related to the second job to a second information processing apparatus included in the plurality of information processing apparatuses coupled to the second leaf switch group, wherein the first communication and the second communication are collective communication in which each of the plurality of information processing apparatuses communicates with other information processing apparatuses.

8. The method according to claim 7, further comprising: identifying, by the processor, the first leaf switch group and the second leaf switch group based on an array having elements which are values indicating whether a plurality of leaf switch groups corresponding to the plurality of columns in the lattice part are allocated to a job, the first leaf switch group and the second leaf switch group being among the plurality of leaf switch groups which have not been allocated to the job.

9. The method according to claim 7, further comprising: identifying, by the processor, the first leaf switch group and the second leaf switch group based on a queue for managing allocation of a plurality of leaf switch groups corresponding to the plurality of columns in the lattice part to a job, the first leaf switch group and the second leaf switch group being among the plurality of leaf switch groups which have not been allocated to the job.

10. The method according to claim 7, wherein each of the plurality of information processing apparatuses coupled to the first leaf switch group performs the first communication of the first job based on the first schedule information, and each of the plurality of information processing apparatuses coupled to the second leaf switch group performs the second communication of the second job based on the second schedule information.

11. The method according to claim 10, wherein each of the plurality of information processing apparatuses coupled to the first leaf switch group transmits a first packet using one of the plurality of spine switches different from part of the plurality of spine switches used by other information processing apparatuses coupled to the leaf switch in common, in each of phases of the first communication, and each of the plurality of information processing apparatuses coupled to the second leaf switch group transmits a second packet using one of the plurality of spine switches different from part of the plurality of spine switches used by other information processing apparatuses coupled to the leaf switch in common, in each of phases of the second communication.

12. The method according to claim 7, wherein the first communication and the second communication are the collective communication in which each of the plurality of information processing apparatuses communicates with all other information processing apparatuses.

13. A non-transitory computer-readable storage medium storing a program that causes a processor to execute a process, the processor being included in an information processing system including a plurality of spine switches, a plurality of information processing apparatuses, and a plurality of leaf switches each which couples the plurality of information processing apparatuses and the plurality of spine switches in a Latin square fat-tree topology, the process comprising:
    allocating a first leaf switch group of the plurality of leaf switches to a first job, the first leaf switch group corresponding to a first column of a plurality of columns in a lattice part including points other than points at infinity of a finite projective plane corresponding to the Latin square fat-tree, and allocate a second leaf switch group of the plurality of leaf switches to a second job, the second leaf switch group corresponding a second column different from the first column of the plurality of columns; and
    transmitting first schedule information on first communication related to the first job to a first information processing apparatus included in the plurality of information processing apparatuses coupled to the first leaf switch group, and second schedule information on second communication related to the second job to a second information processing apparatus included in the plurality of information processing apparatuses coupled to the second leaf switch group, wherein the first communication and the second communication are collective communication in which each of the plurality of information processing apparatuses communicates with other information processing apparatuses.

14. The non-transitory computer-readable storage medium according to claim 13, the process further comprising: identifying the first leaf switch group and the second leaf switch group based on an array having elements which are values indicating whether a plurality of leaf switch groups corresponding to the plurality of columns in the lattice part are allocated to a job, the first leaf switch group and the second leaf switch group being among the plurality of leaf switch groups which have not been allocated to the job.

15. The non-transitory computer-readable storage medium according to claim 13, the process further comprising: identifying the first leaf switch group and the second leaf switch group based on a queue for managing allocation of a plurality of leaf switch groups corresponding to the plurality of columns in the lattice part to a job, the first leaf switch group and the second leaf switch group being among the plurality of leaf switch groups which have not been allocated to the job.

16. The non-transitory computer-readable storage medium according to claim 13, wherein each of the plurality of information processing apparatuses coupled to the first leaf switch group performs the first communication of the first job based on the first schedule information, and each of the plurality of information processing apparatuses coupled to the second leaf switch group performs the second communication of the second job based on the second schedule information.

17. The non-transitory computer-readable storage medium according to claim 16, wherein each of the plurality of information processing apparatuses coupled to the first leaf switch group transmits a first packet using one of the plurality of spine switches different from part of the plurality of spine switches used by other information processing apparatuses coupled to the leaf switch in common, in each of phases of the first communication, and each of the plurality of information processing apparatuses coupled to the second leaf switch group transmits a second packet using one of the plurality of spine switches different from part of the plurality of spine switches used by other information processing apparatuses coupled to the leaf switch in common, in each of phases of the second communication.

18. The non-transitory computer-readable storage medium according to claim 13, wherein the first communication and the second communication are the collective communication in which each of the plurality of information processing apparatuses communicates with all other information processing apparatuses.

19. The information processing system according to claim 1, wherein each of the plurality of leaf switches is coupled to respective two or more spine switches of the plurality of spine switches and the two or more spine switches correspond to respective line segments having different slopes on the finite projective plane.

20. The method according to claim 7, wherein each of the plurality of leaf switches is coupled to respective two or more spine switches of the plurality of spine switches and the two or more spine switches correspond to respective line segments having different slopes on the finite projective plane.

* * * * *